(12) United States Patent
Kitayama et al.

(10) Patent No.: US 10,406,617 B2
(45) Date of Patent: Sep. 10, 2019

(54) METHOD FOR MACHINING WORKPIECE AND MACHINE TOOL

(71) Applicant: Yamazaki Mazak Corporation, Niwa-gun (JP)

(72) Inventors: Minoru Kitayama, Niwa-gun (JP); Hiroshi Itoh, Niwa-gun (JP); Yuki Yamamoto, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 15/702,760

(22) Filed: Sep. 13, 2017

(65) Prior Publication Data

US 2018/0001403 A1 Jan. 4, 2018

Related U.S. Application Data

(63) Continuation of application No. PCT/JP2015/071074, filed on Jul. 24, 2015.

(51) Int. Cl.
*B23C 3/28* (2006.01)
*B23F 5/20* (2006.01)
(Continued)

(52) U.S. Cl.
CPC .............. *B23F 5/20* (2013.01); *B23C 1/12* (2013.01); *B23C 3/28* (2013.01); *B23C 3/30* (2013.01);
(Continued)

(58) Field of Classification Search
CPC .......... B23Q 27/003; B23C 3/28; B23C 3/30; Y10T 409/303752; Y10T 409/303808;
(Continued)

(56) References Cited

U.S. PATENT DOCUMENTS 1,614,558 A * 1/1927 Kasley ...................... B23C 3/30
144/89
2,191,559 A * 2/1940 Drummond ............... B23C 1/00
409/132
(Continued)

FOREIGN PATENT DOCUMENTS

DE 2923848 A1 * 1/1980 ............... B23F 15/08
DE 3006645 A1 * 9/1981 ............... B23C 3/30
(Continued)

OTHER PUBLICATIONS

International Preliminary Report on Patentability (Chapter I) with translation of Written Opinion for corresponding International Application No. PCT/JP2015/071074, dated Jan. 30, 2018.
(Continued)

*Primary Examiner* — Sunil K Singh
*Assistant Examiner* — Michael Vitale
(74) *Attorney, Agent, or Firm* — Mori & Ward, LLP

(57) ABSTRACT

A method for machining a workpiece, includes: rotating a rotary tool around a rotation axis, the rotary tool including at least one edge positioned on an outer periphery of the rotary tool around the rotation axis; relatively moving the rotary tool toward the workpiece in a first direction so that the at least one edge cuts the workpiece by a predetermined depth while the rotary tool is rotated around the rotation axis; and relatively moving the rotary tool with respect to the workpiece in a second direction that is substantially perpendicular to the first direction and that is inclined to a third direction substantially perpendicular to the rotation axis and the first direction.

8 Claims, 14 Drawing Sheets

(51) Int. Cl.
   *B23F 15/00*   (2006.01)
   *B23Q 27/00*   (2006.01)
   *B23C 3/30*    (2006.01)
   *B23C 1/12*    (2006.01)
   *B23F 21/12*   (2006.01)
   *B23F 21/14*   (2006.01)
   *B23F 5/16*    (2006.01)

(52) U.S. Cl.
   CPC .............. *B23F 5/163* (2013.01); *B23F 15/00* (2013.01); *B23F 21/12* (2013.01); *B23F 21/143* (2013.01); *B23Q 27/003* (2013.01); *B23C 2220/36* (2013.01); *B23C 2220/605* (2013.01)

(58) Field of Classification Search
   CPC . Y10T 409/101113; Y10T 409/101272; B23F 15/00
   USPC .................. 144/136.1, 24; 409/131, 132
   See application file for complete search history.

(56) References Cited

U.S. PATENT DOCUMENTS

| | | | | |
|---|---|---|---|---|
| 2,397,086 A * | 3/1946 | Brady | ............ | B23C 3/30 409/132 |
| 2,887,912 A * | 5/1959 | Beach | ............ | B23Q 27/003 82/1.3 |
| 2,926,570 A * | 3/1960 | Bowen | ............ | B23C 3/30 409/191 |
| 3,001,456 A * | 9/1961 | Bober | ............ | B23C 1/00 144/238 |
| 3,007,373 A * | 11/1961 | Wrubleski | ............ | B23F 19/101 409/9 |
| 3,289,501 A * | 12/1966 | Dubrovin | ............ | B23Q 27/003 29/558 |
| 3,796,466 A | 3/1974 | Lasch, Jr. | | |
| 5,201,618 A * | 4/1993 | Malarz | ............ | B23C 3/00 408/1 R |
| 5,713,253 A * | 2/1998 | Date | ............ | G05B 19/184 409/131 |
| 5,791,840 A * | 8/1998 | Sijtstra | ............ | B23F 5/04 409/12 |
| 2007/0127995 A1 | 6/2007 | Matsumura et al. | | |
| 2010/0209202 A1 | 8/2010 | Scherbarth | | |
| 2012/0003058 A1 | 1/2012 | Hutter et al. | | |
| 2012/0076595 A1 | 3/2012 | Sågström et al. | | |
| 2012/0230792 A1 | 9/2012 | Muraki et al. | | |
| 2013/0183888 A1 | 7/2013 | Guo et al. | | |
| 2013/0322974 A1 | 12/2013 | Scherbarth | | |

FOREIGN PATENT DOCUMENTS

| | | |
|---|---|---|
| EP | 1561532 | 8/2005 |
| EP | 2172294 | 4/2010 |
| EP | 2433735 | 3/2012 |
| JP | 06-8026 | 1/1994 |
| JP | 2005-96399 | 4/2005 |
| JP | WO2009/013783 | 1/2009 |
| JP | 4732549 | 7/2011 |
| JP | 2012-066380 | 4/2012 |
| JP | 5714503 | 5/2012 |
| JP | 2013-99829 | 5/2013 |
| JP | 2013-543450 | 12/2013 |
| SU | 557878 A1 * | 5/1977 |
| SU | 1634725 A1 * | 3/1991 |
| WO | WO 2012/052367 | 4/2012 |

OTHER PUBLICATIONS

Extended European Search Report for corresponding EP Application No. 15899554.8-1019, dated Feb. 23, 2018.
International Search Report for corresponding International Application No. PCT/JP2015/071074, dated Sep. 1, 2015.
Japanese Office Action for corresponding JP Application No. 2016-519893, dated May 31, 2016 (w/ English machine translation).

* cited by examiner

BACKGROUND ART

BACKGROUND ART

BACKGROUND ART

METHOD FOR MACHINING WORKPIECE AND MACHINE TOOL

CROSS REFERENCE TO RELATED APPLICATIONS

This application is a continuation application of International Application No. PCT/JP2015/071074, filed on Jul. 24, 2015, entitled "METHOD FOR MACHINING GROOVE", the entire contents of which are incorporated herein by reference.

BACKGROUND OF THE INVENTION

Field of the Invention

The present invention relates to a method for machining a workpiece and to a machine tool.

Discussion of the Background

Concerning forming of a groove portion on a surface of a workpiece, for example, machining of a groove portion that constitutes a tooth surface of a gear wheel, a technology is known in which a milling tool (gear milling cutter) including a plurality of cutting edges at regular intervals on an outer periphery surface of the milling tool is used. In the technology, after the milling tool is rotated and the cutting edges have been moved to a depth of cut of the workpiece, machining is performed by feeding the milling tool and the workpiece relatively (see Japanese Patent Application Laid-Open Publication No. 2012-66380: patent document 1).

The gear milling cutter described in the patent document 1 includes a plurality of root inserts and a plurality of flank inserts on both sides of the cutter. The root inserts are disposed at regular intervals adjacent to the outer periphery surface of the disc-shaped basic body. Furthermore, the flank inserts are disposed inward from the root inserts in a radial direction of the basic body at regular intervals.

In this case, making the disposition of the root inserts and the flank inserts approximately equal to the shape of the actual tooth surface to be machined achieves high precision machining as long as rigidity of the cutter is ensured, because the root inserts perform machining of a bottom face and a deep area of lateral faces of the tooth surface and the flank inserts perform machining of the shallow area of the lateral faces of the tooth surface, simultaneously.

However, concerning the gear milling cutter described in the patent document 1, in a case that a specification such as the number of the tooth and a pitch or a module of the gear wheel to be produced is different, a different cutter on which the inserts are disposed so that they meet the specification is required for each machining.

In particular, many inserts of at least two types that differ in their shapes (root insert and flank insert) need to be disposed on the cutter in order to constitute a gear milling cutter of one specification, therefore it takes time to mount each insert accurately. Moreover, because poor managing of wear condition of each insert may cause defects in machining, frequent checking of the inserts is needed. The above two factors lead to higher costs.

Furthermore, in this configuration, a depth of cut to be machined at a time on a workpiece should be at least a depth up to the root insert. This makes counter force that the gear milling cutter receives higher, therefore the power to feed the cutter needs to be inevitably higher.

As a way of solving these problems, another method is known in which machining of the tooth surface of the gear wheel is performed with a disc-shaped milling tool (side cutter) on which a plurality of cutting inserts are disposed at regular intervals on the outer periphery surface of its disc-shaped basic body. Each of the cutting inserts includes a cutting part both on the outer periphery surface side and on the lateral face side of the basic body. (see Japanese Unexamined Patent Application Publication No. 2013-543450: patent document 2).

The method of machining a gear wheel described in the patent document 2 includes feeding the above-mentioned side cutter and the workpiece relatively in the direction perpendicular to an axis of rotation of the side cutter. This achieves machining by one moving to a depth of cut.

Moreover, various curved surfaces can be machined by swiveling the axis of rotation within a plane perpendicular to the direction of the length of the tooth surface.

SUMMARY

According to one aspect of the present invention, a method for machining a workpiece includes rotating a rotary tool around a rotation axis, the rotary tool including at least one edge positioned on an outer periphery of the rotary tool around the rotation axis; relatively moving the rotary tool toward the workpiece in a first direction so that the at least one edge cuts the workpiece by a predetermined depth while the rotary tool is rotated around the rotation axis; and relatively moving the rotary tool with respect to the workpiece in a second direction that is substantially perpendicular to the first direction and that is inclined to a third direction substantially perpendicular to the rotation axis and the first direction.

According to another aspect of the present invention, a machine tool includes a rotary tool including an outer periphery surface around a rotation axis and an at least one edge on the outer periphery surface; a spindle unit including a spindle head to rotate the rotary tool around the rotation axis, and a spindle main body to rotate the rotary tool around a first direction; a clamp to hold a workpiece; and a travelling tool to move the spindle unit toward the workpiece in the first direction such that the at least one edge cuts the workpiece by a predetermined depth while the spindle head rotates the rotary tool around the rotation axis, and to move the spindle unit with respect to the workpiece in a second direction that is substantially perpendicular to the first direction and that is inclined to a third direction substantially perpendicular to the rotation axis and the first direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
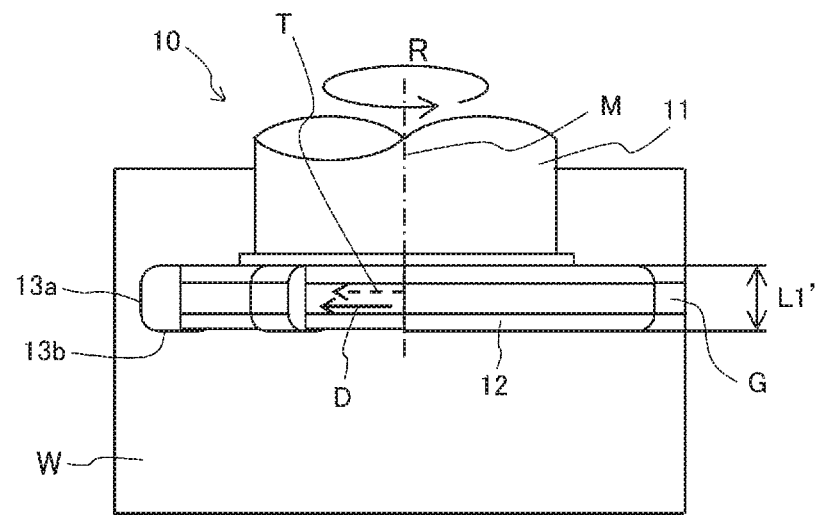
FIG. 1A is a schematic top view of a workpiece and a rotary tool according to an embodiment of performing a conventional method of machining a groove portion with a one-side cutting rotary tool.

The embodiments will now be described with reference to the accompanying drawings, wherein like reference numerals designate corresponding or identical elements throughout the various drawings.

A conventional method of machining a groove portion will be schematically described with reference to FIGS. 1A, 1B, 2A, 2B, 3A, 3B, and 3C, in order to be compared with a method of machining a groove portion according to the embodiments.

Figure 1B:
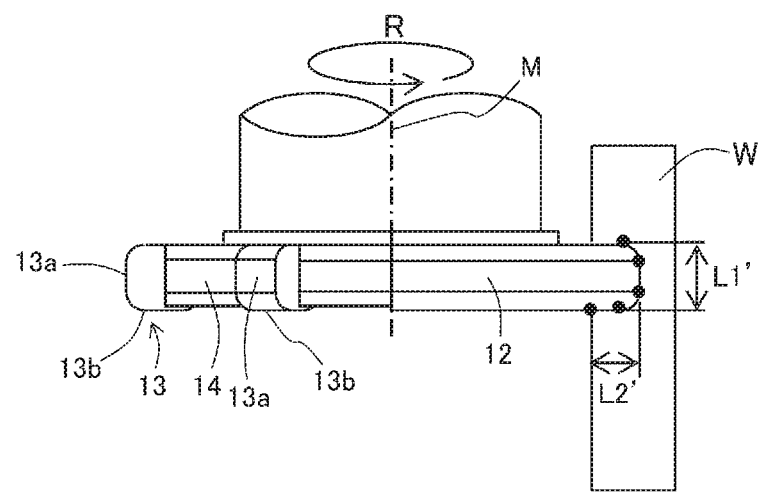
FIG. 1B is another schematic view of the workpiece and the rotary tool illustrated in FIG. 1A according to the embodiment of performing the conventional method of machining a groove portion with the one-side cutting rotary tool. This is the view from behind the feeding direction for the machining.

FIGS. 1A and 1B are schematic views of a workpiece and a rotary tool according to an embodiment of performing a conventional method of machining a groove portion with a one-side cutting rotary tool. FIG. 1A is the top view of the workpiece and the rotary tool and FIG. 1B is the view of the workpiece and the rotary tool illustrated in FIG. 1A from behind the feeding direction for the machining.

Figure 2A:
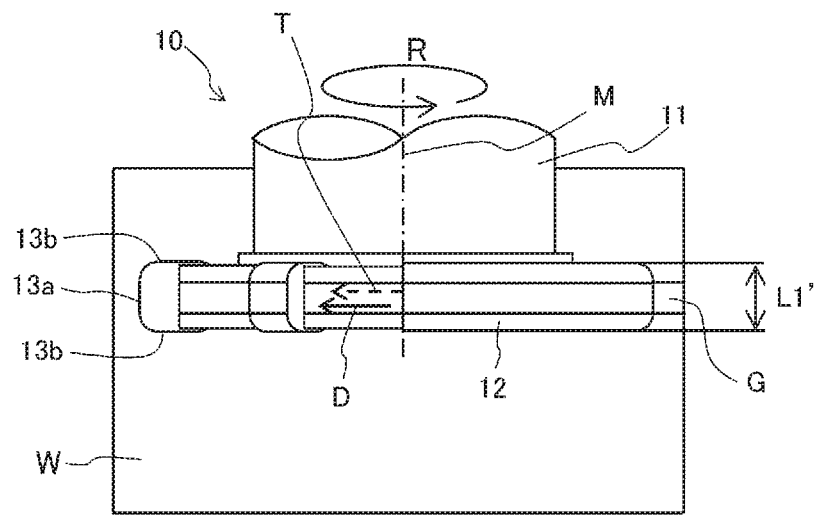
FIG. 2A is a schematic top view of a workpiece and a rotary tool according to an embodiment of performing the conventional method of machining a groove portion with a both-side cutting rotary tool.
Figure 2B:
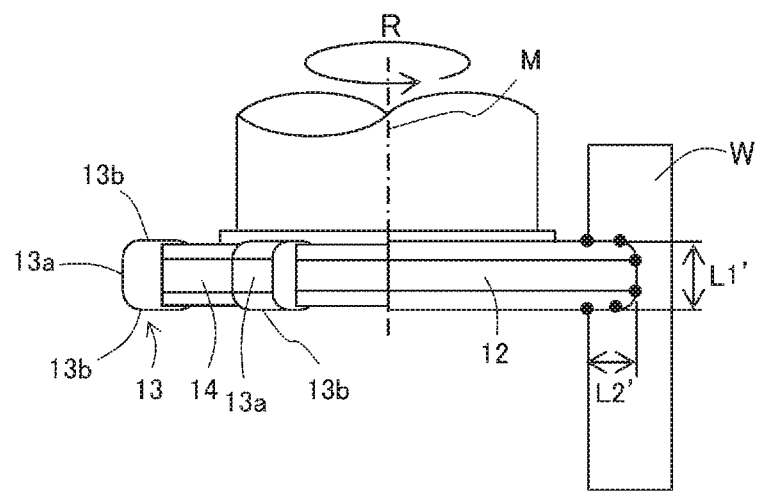
FIG. 2B is another schematic view of the workpiece and the rotary tool illustrated in FIG. 2A according to the embodiment of performing the conventional method of machining a groove portion with the both-side cutting rotary tool. This is a view from behind the feeding direction for the machining.

FIGS. 2A and 2B are schematic views of the workpiece and the rotary tool according to the embodiment of performing the conventional method of machining a groove portion with a both-side cutting rotary tool. FIG. 2A is the top view of the workpiece and the rotary tool and FIG. 2B is the view of the workpiece and the rotary tool illustrated in FIG. 2A from behind the feeding direction for the machining.

Figure 3A:
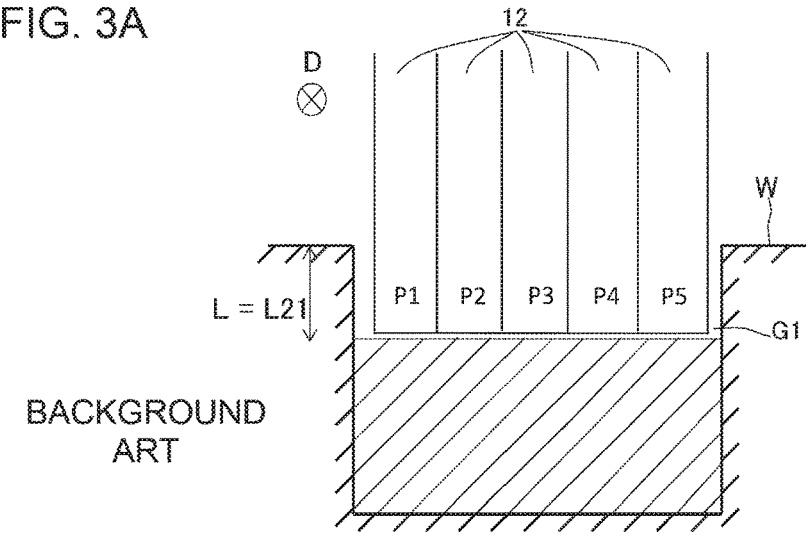
FIG. 3A illustrates an embodiment of machining procedure when forming a groove portion of a larger width than a thickness of the rotary tool in the conventional method of machining a groove portion on a cross-sectional view of the groove portion that has been formed to a first depth of cut from behind the feeding direction for the machining.
Figure 3B:
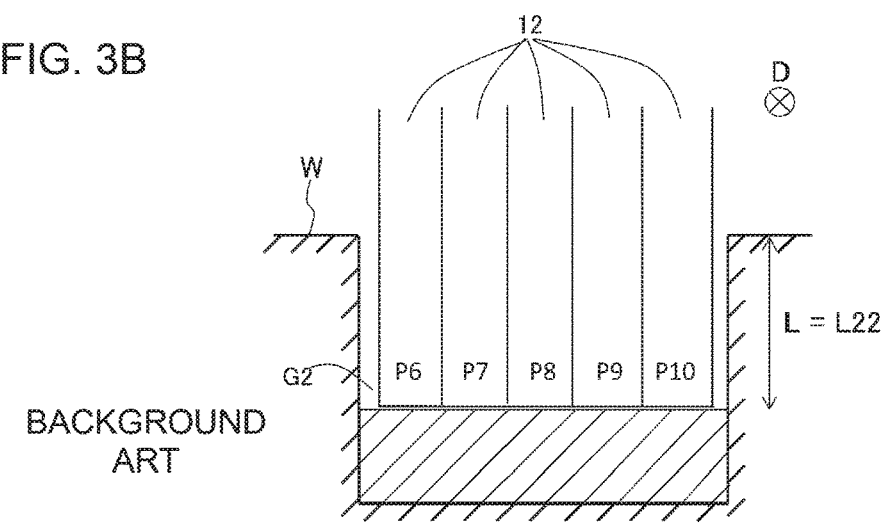
FIG. 3B illustrates an embodiment of machining procedure when forming the groove portion of the larger width than the thickness of the rotary tool in the conventional method of machining a groove portion on a cross-sectional view of the groove portion that has been formed to a second depth of cut from behind the feeding direction for the machining.
Figure 3C:
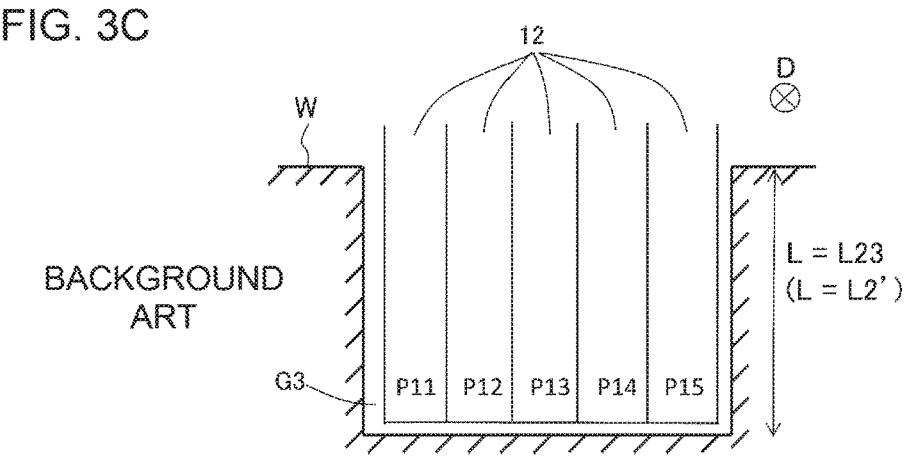
FIG. 3C illustrates an embodiment of machining procedure when forming the groove portion of the larger width than the thickness of the rotary tool in the conventional method of machining a groove portion on a cross-sectional view of the groove portion that has been formed to a third depth of cut from behind the feeding direction for the machining.

Moreover, FIGS. 3A, 3B, and 3C illustrate an embodiment of machining procedure when forming a groove portion of a larger width than a thickness of the rotary tool on a cross-sectional view of the groove portion from behind the feeding direction for the machining. FIG. 3A illustrates the embodiment in which the groove portion has been formed to a first depth of cut. FIG. 3B illustrates the embodiment in which the groove portion has been formed to a second depth of cut and FIG. 3C illustrates the embodiment in which the groove portion has been formed to a third depth of cut.

In FIGS. 1A, 1B, 2A, and 2B, a left half from an axis of rotation of the rotary tool illustrates a state in which the rotary tool is stopped and a right half illustrates a state in which the rotary tool is rotating (machining is being performed).

As shown in FIGS. 1A, 1B, 2A, and 2B, in the conventional method of machining a groove portion, the rotary tool (side cutter) 10 that is composed of a cylinder-shaped base portion 11 and a disc-shaped main body 12 is used. The base portion 11 and the main body 12 are unified in such a way that their central axes are coincident with each other.

A plurality of cutting inserts 13 are mounted at regular intervals on the outer periphery surface of the main body 12, and an intermediate portion 14 is formed between any two of the cutting inserts 13 next to each other. That is, the plurality of cutting inserts 13 and the intermediate portions 14 are disposed alternately on the outer periphery surface of the main body 12.

Two types of rotary tool are available as the rotary tool 10 that is used in the conventional method of machining a groove portion.

A first type rotary tool 10 has the above-described plurality of cutting inserts, each of which includes an outer edge 13a that is located in the direction parallel to the outer periphery surface of the main body 12 and a side edge 13b that is located on a lower lateral face of the main body 12, as shown in FIGS. 1A and 1B.

In this specification, this first type rotary tool 10 is referred to as a "one-side cutting rotary tool".

Meanwhile, a second type rotary tool has the plurality of cutting inserts mentioned above, each of which includes the outer edge 13a located in the direction parallel to the outer periphery surface of the main body 12 and a pair of side edges 13b located on an upper and the lower lateral faces of the main body 12 across the outer edge 13a, as shown in FIGS. 2A and 2B.

In this specification, this second type rotary tool 10 is referred to as a "both-side cutting rotary tool".

Making the rotary tool 10 with each of these configurations rotate in the direction R, contact and cut the workpiece W makes the outer edge 13a cut the bottom face and makes the side edge 13b cut the lateral face. As a result, a groove portion (concave portion) is formed on the surface of the workpiece W.

In the conventional method of machining a groove portion, as shown in FIGS. 1A and 2A, the rotary tool 10 is rotated in the direction R and is moved to the predetermined depth of cut L2' based on the surface of the workpiece W (surface to be machined), in a condition that a rotating direction T (tangential direction) at a point at which the outer periphery surface of the rotary tool 10 contacts the workpiece W is coincident with the feeding direction D for machining the groove portion to be machined (that is, the axis of rotation M of the rotary tool 10 and the feeding direction D for machining the groove portion are at right angles to each other).

Next, the rotary tool 10 and the workpiece W are fed relatively in the feeding direction D for machining the groove portion in the condition that the rotary tool 10 keeps the depth of cut L2'.

The motions as above form the groove portion G of the width L1' and the maximum depth L2' on the surface to be machined of the workpiece W.

It is noted that in a case that the one-side cutting rotary tool 10 is used, as shown in FIGS. 1A and 1B, in the groove portion G only one of the lateral faces on which the side edge 13b contacts the workpiece W is machined.

Meanwhile, in a case that the both-side cutting rotary tool 10 is used, as shown in FIGS. 2A and 2B, in the groove portion G the pair of the side edges 13b contact the workpiece W, as a result, both of the lateral faces of the groove portion G are machined.

As shown in FIGS. 1A, 1B, 2A, and 2B, in the conventional method of machining a groove portion, the width of the groove portion machined by one-time machining is almost same as the thickness of the main body 12 of the rotary tool 10.

Therefore, in a case that the width of the desired groove portion G is larger than the thickness of the main body 12 of the rotary tool 10, the width of the desired groove portion is divided into five portions, for example, as shown in FIGS. 3A, 3B, and 3C, and the machining position of the main body 12 is shifted in the direction of the width of the groove portion G, then the machining method is performed repeatedly at every machining position.

In the embodiment illustrated in FIGS. 3A, 3B, and 3C, machining of the groove portion performed with the both-side cutting rotary tool 10 shown in FIGS. 2A and 2B will be described.

As shown in FIG. 3A, first, a first groove portion of a depth of cut L21 is formed from the upper side of the workpiece W at a tool position P1 that is adjacent to one of the lateral faces of the desired groove portion G. Next, repeating the machining at the tool positions P2 to P5 of the main body 12 of the rotary tool 10 in a condition that the depth of cut L21 is kept unchanged forms a second groove portion to a fifth groove portion. In this way, the groove portion G1 of the depth L21 is formed.

It is noted that in FIG. 3A, the tool position P1 of the first groove portion is adjacent to one of the lateral faces of the desired groove portion G, but, the tool position P1 may be set first in the center of the groove portion G to machine a first groove portion, then a second groove portion to a fifth groove portion may be formed both on the left and on the right of the first groove portion toward the lateral faces, for example.

Next, the depth of cut of the main body 12 of the rotary tool 10 is set to the depth of cut L22 which is larger than L21, and the groove portion G2 of the depth L22 is formed by repeating the machining at the tool positions P6 to P10 that are shown in FIG. 3B.

In this case, the tool positions from P6 to P10 may be set in any order, as is the case in the above-described machining of the groove portion G1.

Furthermore, the depth of cut of the main body 12 of the rotary tool 10 is set to the depth of cut L23 which is larger than L22, and the groove portion G3 of the depth of L23 is formed by repeating the machining at the tool positions P11 to P15 that are shown in FIG. 3C.

The procedure as above forms the groove portion G of the width L1' and the depth L2', for example, as is the case in FIGS. 1B and 2B.

According to the conventional method of machining a groove portion illustrated in FIGS. 1A, 1B, 2A, 2B, 3A, 3B, and 3C, as stated above, the cutting resistance (counter force) from the workpiece is received in all the area of the outer edge 13a of the cutting insert 13 because the cutting insert 13 mounted on the outer periphery surface of the main body 12 of the rotary tool 10 is disposed so that it always contacts perpendicularly to the workpiece W.

The cutting resistance becomes higher as the amount of the cutting chips removed by one cutting edge 13 becomes larger, that is, as the depth of cut or a feedrate becomes larger, the deflection force that bends the axis of rotation becomes higher. When the deflection force being generated at the rotary tool 10 exceeds a predetermined threshold, intermittent chattering vibration is caused on the rotary tool 10.

In order to suppress the intermittent chattering vibration, in the case of using the rotary tool (side cutter) 10 in the conventional method, it is possible to reduce the deflection force by decreasing the cutting resistance from the workpiece W to the main body 12. However, as shown in FIGS. 3A, 3B, and 3C, the width that can be machined at one machining position is almost the same as the thickness of the width of the main body 12, therefore, the feedrate of the rotary tool 10 should be smaller to reduce the cutting resistance and, as a result, the total machining time becomes longer.

Now, as the method of machining a groove portion according to the embodiments, a dedicated consideration of the way of reducing the cutting resistance that the cutting insert 13 of the main body 12 receives has led to one method. The method is that a rotating direction T at a point at which the outer periphery surface of the rotary tool 10 (main body 12) contacts the workpiece W is made inclined at a predetermined angle α to the feeding direction D for machining a groove portion, and, the rotary tool 10 is rotated and moved so that its outer periphery surface reaches a predetermined depth of cut based on the surface to be machined of the workpiece W, and then the rotary tool 10 and the workpiece W are fed relatively in the feeding direction D for machining the groove portion.

The method of machining a groove portion according to the embodiments will be described, based on the drawings below.

<A First Embodiment>

Figure 4A:
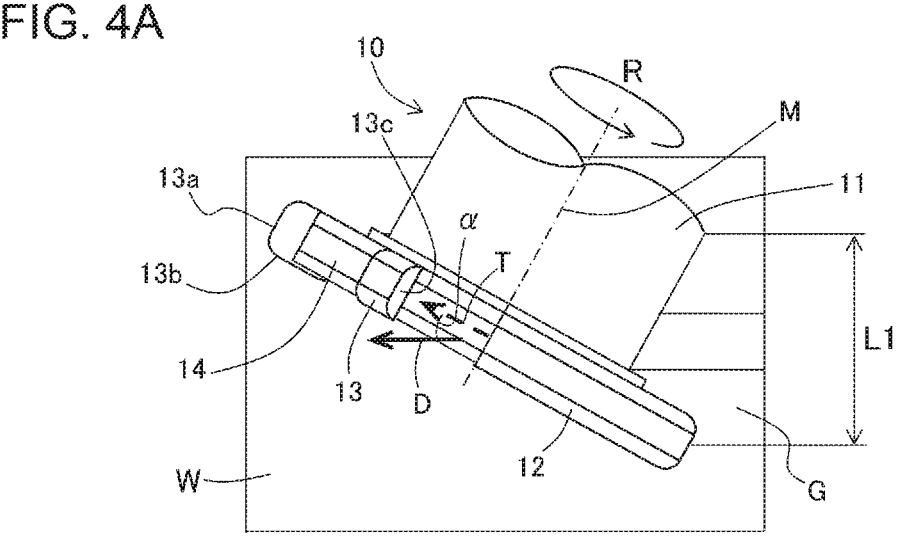
FIG. 4A is a schematic top view of a workpiece and the rotary tool according to a first embodiment in which the method of machining a groove portion is performed with the one-side cutting rotary tool.
Figure 4B:
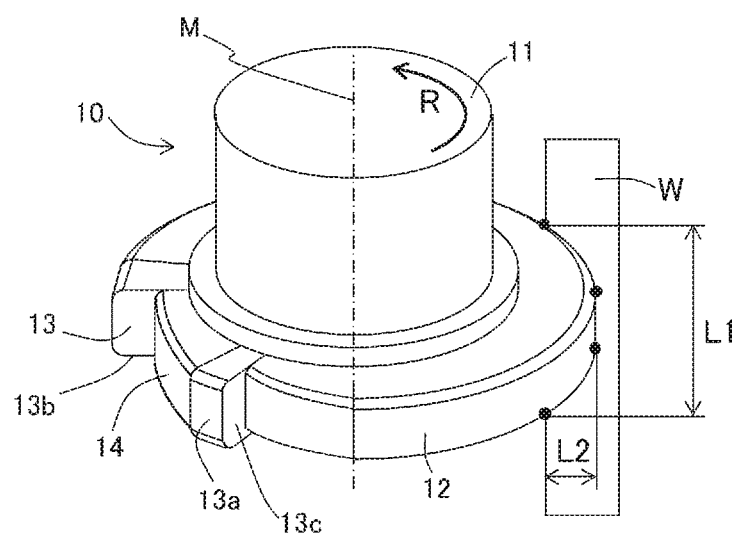
FIG. 4B is another schematic view of the workpiece and the rotary tool illustrated in FIG. 4A according to the first embodiment in which the method of machining a groove portion is performed with the one-side cutting rotary tool. This is the view from behind the feeding direction for the machining.

FIGS. 4A and 4B are schematic views of the workpiece and the rotary tool according to a first embodiment in which the method of machining a groove portion is performed with the one-side cutting rotary tool. FIG. 4A is a top view of the workpiece and the rotary tool and FIG. 4B is another view of the workpiece and the rotary tool illustrated in FIG. 4A from behind the feeding direction for the machining.

Figure 5A:
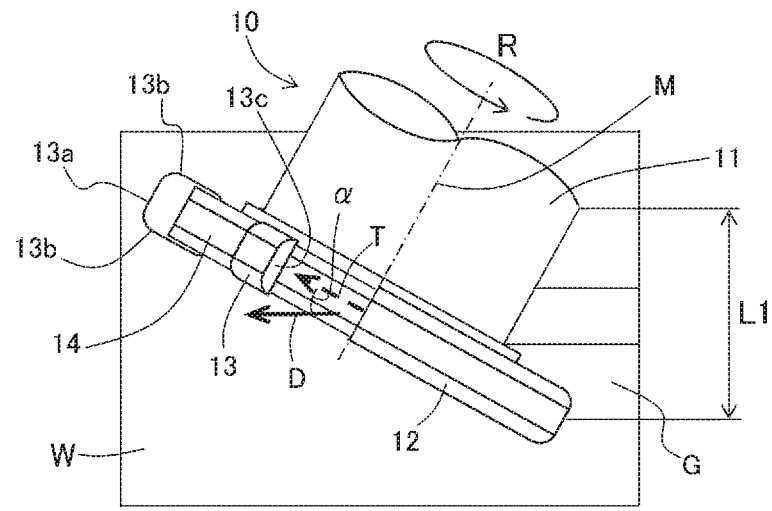
FIG. 5A is a schematic top view of a workpiece and the rotary tool according to the first embodiment in which the method of machining a groove portion is performed with the both-side cutting rotary tool.
Figure 5B:
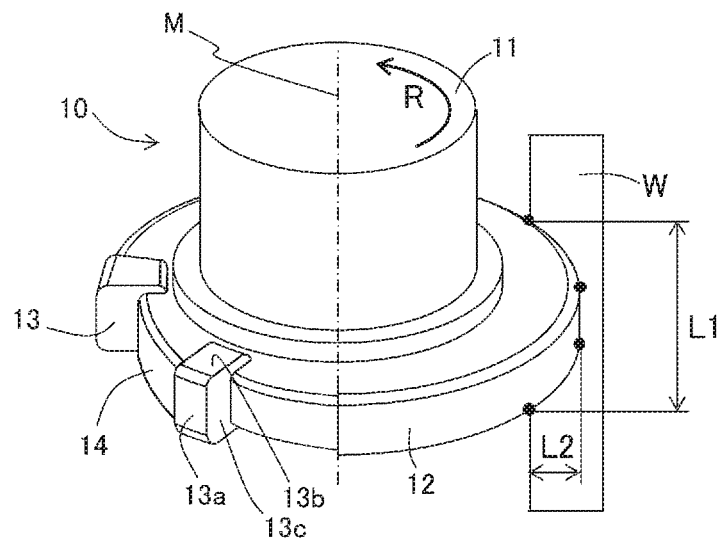
FIG. 5B is another schematic view of the workpiece and the rotary tool illustrated in FIG. 5A according to the first embodiment in which the method of machining a groove portion is performed with the both-side cutting rotary tool. This is the view from behind the feeding direction for the machining

FIGS. 5A and 5B are schematic views of the workpiece and the rotary tool according to the first embodiment in which the method of machining a groove portion is performed with the both-side cutting rotary tool. FIG. 5A is a top view of the workpiece and the rotary tool and FIG. 5B is another view of the workpiece and the rotary tool illustrated in FIG. 5A from behind the feeding direction for the machining.

It is noted that in FIGS. 4A, 4B, 5A, and 5B also, the left half from the axis of rotation of the rotary tool illustrates a state in which the rotary tool is stopped and the right half illustrates a state in which the rotary tool is rotating (machining is being performed), as is the case in FIGS. 1A, 1B, 2A, and 2B.

As shown in FIGS. 4A, 4B, 5A, and 5B, in the method of machining a groove portion according to the first embodiment, the rotary tool 10 that is composed of the cylinder-shaped base portion 11 and the disc-shaped main body 12 unified with the base portion 11 in such a way that the central axis of the main body 12 is coincident with the central axis of the base portion 11 is used, as is the case in the conventional method of machining a groove portion.

On the outer periphery surface of the main body 12, the plurality of cutting inserts 13 are detachably mounted at regular intervals and the intermediate portion 14 is formed between any two of the cutting inserts 13 next to each other. That is, the plurality of cutting inserts 13 and the intermediate portions 14 are disposed alternately on the outer periphery surface of the main body 12.

Also in the method of machining a groove portion according to the first embodiment, the two types of rotary tool 10, "one-side cutting rotary tool 10" and "both-side cutting rotary tool 10", can be used, as is the case in the conventional method of machining a groove portion.

That is, as shown in FIGS. 4A and 4B, the one-side cutting rotary tool 10 has the plurality of cutting inserts 13, each of which includes the outer edge 13a that is located in the direction parallel to the outer periphery surface of the main body 12 and the side edge 13b that is located on the lower lateral face of the main body 12.

Meanwhile, as shown in FIGS. 5A and 5B, the both-side cutting rotary tool 10 has the plurality of cutting inserts 13, each of which includes the outer edge 13a located in the direction parallel to the outer periphery surface of the main body 12 and the pair of side edges 13b across the outer edge 13a located on the upper and lower lateral faces of the main body 12.

Moreover, as shown in FIGS. 4B and 5B, each of the intermediate portions 14 that are formed between the plurality of cutting inserts 13 has a shape such that the radius is smoothly reduced along the rotation direction R in order that a front face 13c of the cutting insert 13 is exposed in the direction opposite to the rotation direction R of the rotary tool 10.

In the method of machining a groove portion according to the first embodiment, as shown in FIGS. 4A and 5A, first, a rotating direction T (tangential direction) at the point at which the outer periphery surface of the rotary tool 10 contacts the workpiece W is made inclined at an angle α to the feeding direction D for machining a groove portion to be machined (an angle of attack is made), and then, the rotary tool 10 is rotated in the direction R and is moved to a predetermined depth of cut L2 based on the surface of the workpiece W (surface to be machined).

Next, the rotary tool 10 and the workpiece W are fed relatively in the feeding direction D for machining the groove portion in the condition that the rotary tool 10 keeps the angle α and the depth of cut L2.

These motions form a groove portion G of the width L1 and the maximum depth L2 on the surface to be machined of the workpiece W.

It is noted that the inclined angle α between the feeding direction D for machining the groove portion and the rotary tool 10 can be determined within a range of angles at which no chattering vibration is caused based on a result obtained by conducting a preliminary test cutting on a workpiece of a same material in advance with reference to, for example, the depth of cut or the feedrate of the rotary tool 10 in the case of the conventional method of machining a groove portion (that is, the angle α=0).

In addition, it may be possible to determine an angle α of any degrees in advance and to conduct a preliminary test cutting to obtain a limit of the machining conditions such as a depth of cut or a feedrate under which the rotary tool 10 inclined at the angle α causes no chattering vibration.

In the method of machining a groove portion according to the first embodiment, in a case in which the depth of cut L2 of the above-described one-time machining does not reach the desired depth of cut of the groove portion, the motion to move the rotary tool 10 to a depth of cut and the motion to feed the workpiece W and the rotary tool 10 relatively at the depth of cut are repeated until the accumulated depth of cut reaches the desired depth of the groove portion described above.

It is preferable that the angle α should be set at every time the above-described motions are repeated.

Next, the effects obtained through the method of machining a groove portion according to the above-described first embodiment will be described with reference to FIGS. 6A and 6B.

Figure 6A:
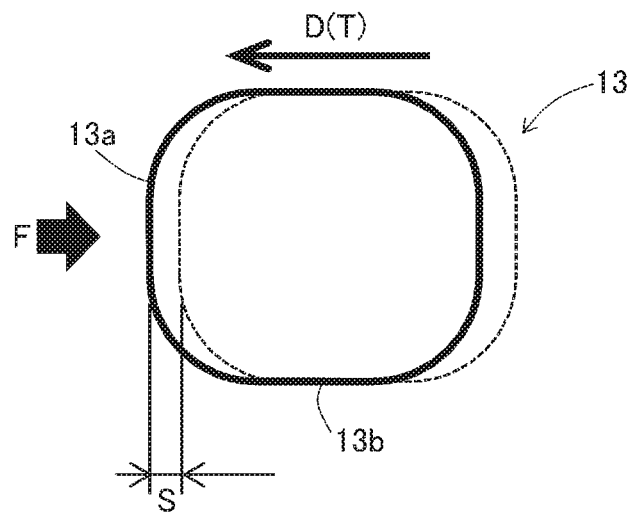
FIG. 6A illustrates a motion that a cutting insert mounted on an outer periphery surface of a main body is machining a workpiece after moving to a depth of cut in the conventional method of machining a groove portion.
Figure 6B:
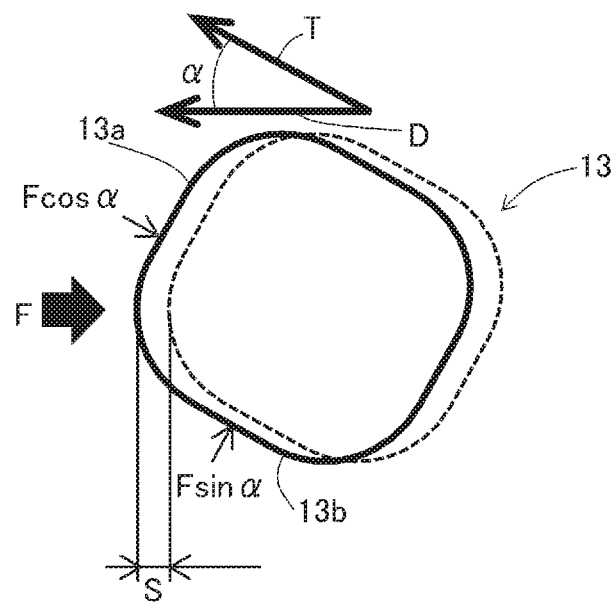
FIG. 6B illustrates a motion that a cutting insert mounted on an outer periphery surface of a main body is machining a workpiece after moving to a depth of cut in the method of machining a groove portion according to the embodiments.

FIGS. 6A and 6B illustrate a motion that the cutting insert 13 mounted on the outer periphery surface of the main body of the rotary tool 10 shown in FIGS. 1A, 1B, 2A, 2B, 4A, 4B, 5A, and 5B, etc., is machining a workpiece after moving to a depth of cut. FIG. 6A illustrates the motion in the conventional method of machining a groove portion and FIG. 6B illustrates the motion in the method of machining a groove portion according to the embodiments.

It is noted that both FIGS. 6A and 6B are views of the cutting insert 13 in a direction toward the center of the rotary tool 10 from the outer periphery surface, and a continuous line represents the cutting insert that is actually contacting the workpiece W at present and a dashed line represents the cutting insert that has performed machining on the workpiece W just before.

The following description regarding FIGS. 6A and 6B is given on an assumption that the depth of cut is same between the conventional method of machining a groove portion and the method of machining a groove portion according to the embodiments.

In the case of the conventional method of machining a groove portion shown in FIG. 6A, that is, in the case in which the machining is performed in such a way that the rotating direction T at the point at which the main body 12 contacts the workpiece W is coincident with the feeding direction D for machining the groove portion, the outer edge 13a perpendicularly contacts the surface to be machined of the workpiece W to perform machining, because the rotary tool 10 is fed in a state that the outer edge 13a of the cutting insert 13 is perpendicular to the rotating direction T at the point at which the rotary tool 10 contacts the workpiece W.

In this case, when it is assumed that the feed amount between consecutive cutting inserts is S and the counter force that the cutting insert 13 receives from the workpiece W is F, the outer edge 13a receives all the counter force F.

Meanwhile, in the case of the method of machining a groove portion according to the first embodiment shown in FIG. 6B, that is, in the case in which the machining is performed in the state that the rotating direction T of the main body 12 at the point at which the main body 12 contacts the workpiece W is inclined at an angle α to the feeding direction D for machining the groove portion, the counter force F received from the workpiece W is divided into a force to the outer edge 13a and a force to the side edge 13b.

In this case, when it is assumed that the feed amount S between consecutive cutting inserts is same as the feed amount in FIG. 6A, the component of the counter force F that the outer edge 13a receives is F cos α and the component of the counter force F that the side edge 13b receives is F sin α, as shown in FIG. 6B.

In the method of machining a groove portion according to the first embodiment, performing machining in the state in which the rotating direction T at the point at which the main body 12 contacts the workpiece W is inclined at an angle α to the feeding direction D for machining the groove portion makes the counter force F that the outer edge 13a of the cutting insert 13 receives reduced to F cos α, while it has received all of the counter force F in the conventional method.

Therefore, in the method of machining a groove portion according to the first embodiment, the cutting resistance (counter force) that the outer edge 13a of the cutting insert 13 receives from the workpiece W can be reduced by comparison with the cutting resistance of the conventional method, and the deflection force transmitted from the main body 12 to the base portion 11 shown in FIGS. 4A, 4B, 5A, and 5B can be made smaller than the predetermined threshold described above. As a result, the chattering vibration of the rotary tool 10 can be suppressed.

Moreover, in the conventional method of machining a groove portion, when it is assumed that no chattering vibration of the rotary tool 10 is caused with the cutting resistance F, the method of machining a groove portion according to the first embodiment enables setting of machining conditions that allow the cutting resistance of the rotary tool 10 inclined at an angle α to be raised to F, such as, a larger depth of cut or a higher feedrate, because making the rotary tool 10 inclined at an angle α can reduce the cutting resistance to F cos α.

Therefore, making the rotating direction T of the rotary tool 10 at the point at which the rotary tool 10 contacts the workpiece W inclined at an angle α to the feeding direction D for machining the groove portion then performing machining can machine larger volume by comparison with the conventional method of machining a groove portion.

Now, because the counter force Fsinα that the side edge 13b of the cutting insert 13 receives is a force to bend the main body 12 to the base portion 11 side, that is, a force in the direction parallel to the axis of rotation of the rotary tool 10, the force F sin α counteracts the deflection force to twist the axis of rotation.

Therefore, the counter force that the side edge 13b receives is a force to negate the deflection force and helps to make the rotation of the rotary tool 10 stable.

In this way, in the method of machining a groove portion according to the first embodiment, the chattering vibration of the rotary tool can be suppressed because the counter force that the outer edge of the cutting insert receives can be made smaller by comparison with the counter force in the conventional machining method and a part of the counter force that the cutting insert receives in its all area can be converted to a component of force that makes the main body stable in the direction parallel to the axis of rotation of the rotary tool.

Moreover, making the rotary tool 10 inclined at an angle α can divide the counter force that the rotary tool receives between the outer edge and the side edge. This makes it possible to set the volume to be machined larger by making the depth of cut larger or the feedrate higher by comparison with the depth of cut or the feedrate of the conventional machining method.

Furthermore, because the counter force that the cutting edge receives can be made smaller, in a case that machining is performed at a same depth of cut and a same feedrate as those of the conventional method of machining a groove portion for example, the load of the cutting edge is reduced, and as a result, this gives the cutting edge a longer life than before.

Next, another effect of the method of machining a groove portion according to the first embodiment will be described, with reference to FIGS. 7A, 7B, 7C, and 7D.

Figure 7A:
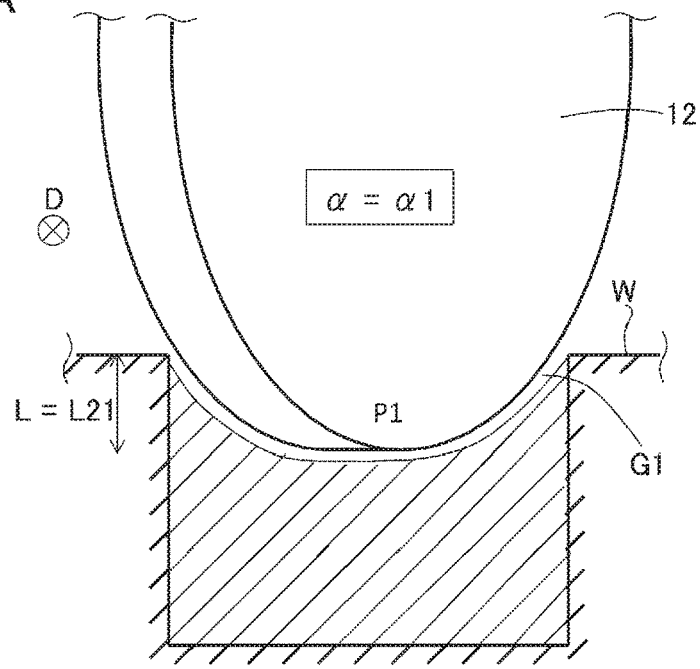
FIG. 7A is an enlarged view of a principal part of a tool and a groove portion that has been machined to a first depth in the first embodiment of the method of machining a groove portion.
Figure 7B:
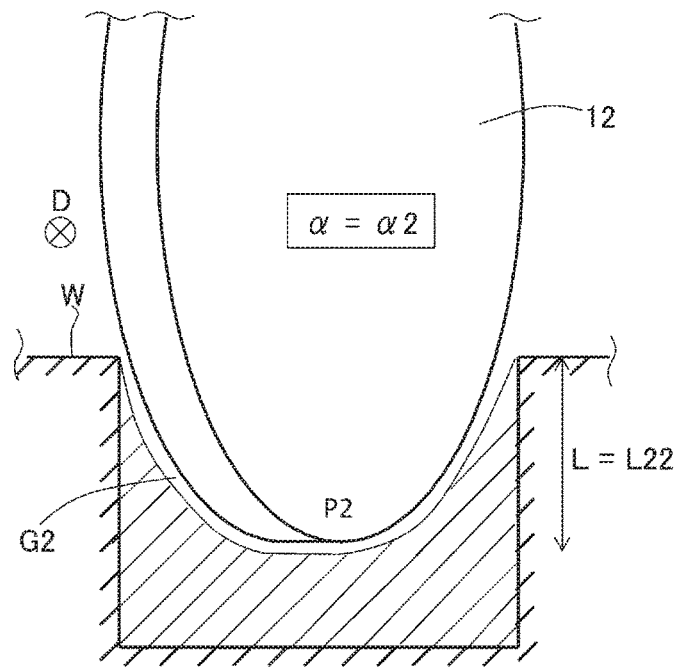
FIG. 7B is an enlarged view of the principal part of the tool and the groove portion that has been machined to a second depth in the first embodiment of the method of machining a groove portion.
Figure 7C:
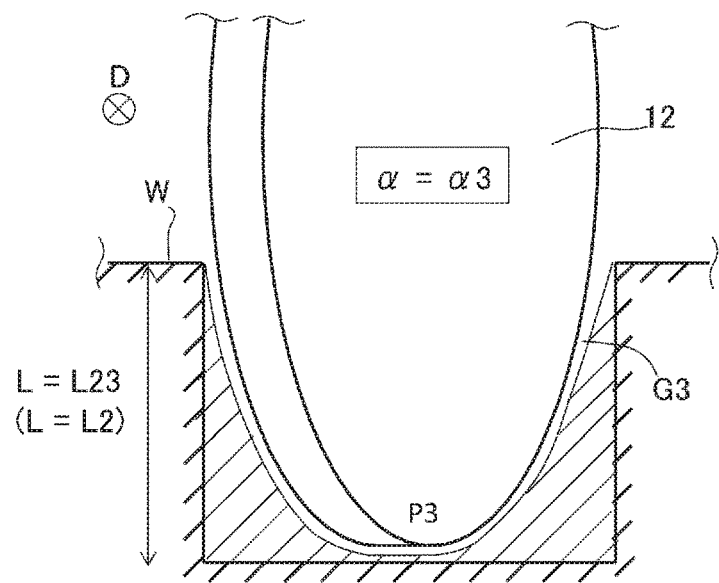
FIG. 7C is an enlarged view of the principal part of the tool and the groove portion that has been machined to a target depth in the first embodiment of the method of machining a groove portion.
Figure 7D:
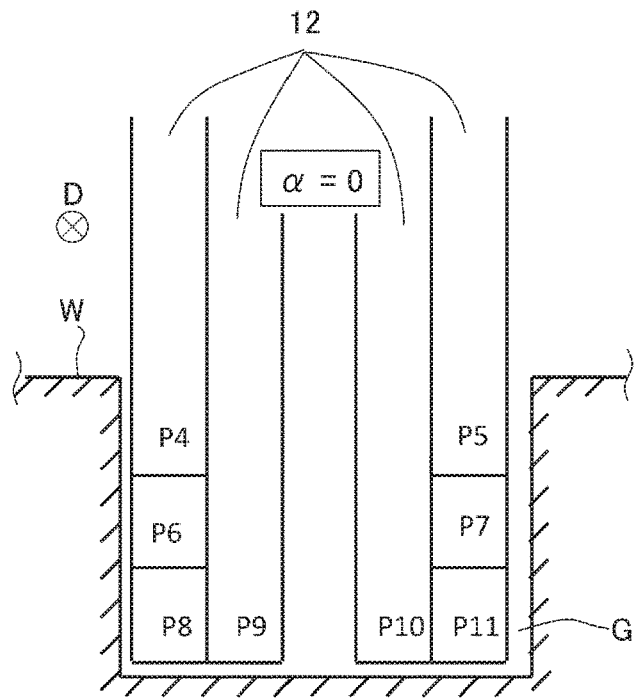
FIG. 7D illustrates an embodiment in which a bottom face and a lateral face of the groove portion are machined according to the first embodiment of the method of machining a groove portion, on an enlarged sectional view of the groove portion.

FIGS. 7A, 7B, 7C, and 7D illustrate an embodiment of machining procedure when forming a groove portion according to the first embodiment on a cross-sectional view of the groove portion. FIG. 7A illustrates the embodiment in which the groove portion has been machined to a first depth, FIG. 7B illustrates the embodiment in which the groove portion has been machined to a second depth, FIG. 7C illustrates the embodiment in which the groove portion has been machined to a target depth and FIG. 7D schematically illustrates the embodiment in which a lateral face and a bottom face of the groove portion are machined.

In the embodiment illustrated in FIGS. 7A, 7B, 7C, and 7D, machining of a groove portion performed with the both-side cutting rotary tool 10 shown in FIGS. 5A and 5B will be described.

Here, it is assumed that the groove portion in FIGS. 7A, 7B, 7C, and 7D has a same width and a same depth as the width and the depth of the groove portion that was machined with the conventional method of machining a groove portion illustrated in FIGS. 3A, 3B, and 3C. Moreover, each of the cross-sectional views in FIGS. 7A, 7B, 7C, and 7D is a view of a groove portion from behind the feeding direction for the machining.

First, as shown in FIG. 7A, the rotary tool 10 has been made inclined at an angle α1 (that is, α=α1 in FIG. 5A) to the feeding direction D for machining the groove portion, and the rotary tool 10 is rotated at a predetermined rotation speed and moved to the depth L21 (that is, L2=L21 in FIG. 5B) (tool position P1).

In this case, it is preferable that, for example in a case that the depth of cut is set at L21 in the preliminary test cutting, the angle α1 should be a maximum inclined angle at which no chattering vibration of the rotary tool 10 is caused. Moreover, in a case that an angle within the maximum inclined angle can machine the entire width of the groove portion, as is the case in FIG. 7A, it is preferable to adopt an angle that can machine the entire width of the groove portion by one feeding motion.

Then, in the state that the angle α1 and the depth L21 are kept, the workpiece W and the rotary tool 10 are fed relatively in the feeding direction D for machining the groove portion.

The motions as above form the groove portion G1 of the depth L21 and of a uniform width on the workpiece W. In the case that the maximum width machined by the rotary tool 10 inclined at an angle α1 is smaller than the required width of the groove portion (for example, L1 that is shown in FIGS. 3A, 3B, and 3C), the desired width of the groove portion is formed by repeating the machining at every time to change the machining position of the inclined rotary tool 10 in the direction of the width.

Next, as shown in FIG. 7B, the rotary tool 10 is inclined at an angle α2 which is smaller than the angle α1 (that is, α2<α1) to the feeding direction D for machining the groove portion, and in this state the rotary tool 10 is rotated and moved to the depth of cut L22 (tool position P2).

In this case, it is preferable that an angle α that enables machining of the entire width of the groove portion by one feeding motion may be adopted as the angle α2, as is the case in FIG. 7A. Because the angle α2 is smaller than the angle α1, the cutting resistance (counter force) F cos α that the outer edge 13a of the cutting insert 13 of the main body 12 receives becomes higher. For this reason, it is necessary that the angle α2 should be an angle at which no chattering vibration of the rotary tool 10 is caused against the case of FIG. 7A (see FIG. 6B).

Then, in the state that the angle α2 and the depth L22 are kept, the workpiece W and the rotary tool 10 are fed relatively in the feeding direction D for machining the groove portion.

The motions as above form the groove portion G2 of the depth L22 and of a uniform width on the workpiece W. It is noted that in the machining of the groove portion G2 also, in the case that the maximum width machined by the rotary tool 10 inclined at an angle α2 is smaller than the required width of the groove portion, the machining may be repeated at every time to change the machining position of the inclined rotary tool 10 in the direction of the width, as is the case in the machining of the groove portion G1 illustrated in FIG. 7A.

Next, as shown in FIG. 7C, the rotary tool 10 is inclined at an angle α3 which is further smaller than the α2 (that is, α3<α2) to the feeding direction D for machining the groove portion, and in this state the rotary tool 10 is rotated and moved to the depth L23 (In this description, it is assumed that L23 is equal to the target depth L2.) (tool position P3).

In this case also, it is preferable that an angle that enables machining of the entire width of the groove portion by one feeding motion may be adopted, as is the case in FIG. 7A. It is also noted that because the angle α3 is smaller than the angle α2, the cutting resistance (counter force) Fcosα that the outer edge 13a of the cutting insert 13 receives becomes further higher. For this reason, it is necessary that the angle α3 should be an angle at which no chattering vibration of the rotary tool 10 is caused (see FIG. 6B).

Then, in the state that the angle α3 and the depth L23 are kept, the workpiece W and the rotary tool 10 are fed relatively in the feeding direction D for machining the groove portion.

The motions as above form the groove portion G3 of the depth L23 (that is, the target depth L2) and of a uniform width on the workpiece W. It is noted that in the machining of the groove portion G3 also, in the case that the maximum width machined by the rotary tool 10 inclined at an angle α3 is smaller than the required width of the groove portion, the machining may be repeated at every time to change the machining position of the inclined rotary tool 10 in the direction of the width, as is the case in the machining of the groove portion G1 illustrated in FIG. 7A.

It is noted that in the above-described machining illustrated in FIG. 7A, 7B, and 7C, relatively feeding the disc-shaped rotary tool 10 that is inclined to the feeding direction D for machining the groove portion makes the machined surface (inner surface of the groove portion) a continuous curved surface approximate to a part of an ellipse, on the cross-sectional plane crossing at a right angle to the feeding direction D for machining the groove portion (see FIG. 7C, for example).

Therefore, following the processes illustrated in FIG. 7A, 7B, and 7C, the machining of the lateral face and the bottom face that constitute the final shape of the groove portion is performed in additional processes.

In the additional processes, as an embodiment of them, as shown in FIG. 7D, the inclined angle α between the rotary tool 10 and the feeding direction D for machining the groove portion is set to zero (that is, α=0 in FIG. 5A) and the rotary tool 10 is disposed at the tool positions P4 to P11 so that the shape of the lateral faces and the bottom face of the target groove portion can be machined.

Then, the lateral faces and the bottom face of the groove portion are machined by feeding the workpiece W and the rotary tool 10 relatively at each of the tool positions P4 to P11.

The motions as above can machine the lateral faces of the groove portion flat as if copying the shape of the lateral face of the main body 12 and can also machine the bottom face flat. In this way, the groove portion G of the desired width and depth is formed on the workpiece W.

As shown in FIGS. 7A, 7B, 7C, and 7D, the method of machining a groove portion according to the first embodiment can reduce the number of times to repeat the machining compared with the conventional machining method illustrated in FIGS. 3A, 3B, and 3C when forming the same shape of the groove portion.

That is, in FIGS. 3A, 3B, 3C, 7A, 7B, 7C, and 7D, when it is assumed that the width and the depth of the groove portion in FIGS. 3A, 3B, and 3C are equal to the width and the depth of the groove portion in FIGS. 7A, 7B, 7C, and 7D, in the conventional machining method, the feeding direction D for machining the groove portion and the rotating direction T at the point at which the main body 12 contacts the workpiece W are coincident with each other. This allows only machining of a width that is equal to the thickness of the main body 12 at one tool position, therefore, in FIGS. 3A, 3B, and 3C for example, the machining needs to be performed 15 times repeatedly from the tool positions P1 to P15.

On the contrary, in the method of machining a groove portion according to the first embodiment, as shown in FIGS. 7A, 7B, and 7C, making the rotating direction T at the point at which the main body 12 contacts the workpiece W inclined at an angle α to the feeding direction D for machining the groove portion makes an orbit of the main body 12 that is projected onto the cross-sectional plane perpendicular to the groove portion similar to a part of an ellipse. This enables machining of a larger width at one tool position by comparison with the conventional machining method, therefore, in FIGS. 7A, 7B, 7C, and 7D, for example, the number of times to repeat the machining is reduced to 11 times at the tool positions P1 to P11.

Therefore, the method of machining a groove portion according to the first embodiment can reduce the number of times to repeat the machining in the central area of the desired groove portion G, and as a result, can reduce the total time for machining a groove portion by comparison with the conventional method of machining a groove portion.

Moreover, as described above, making the rotating direction T at the point at which the rotary tool 10 contacts the workpiece W inclined at an angle α to the feeding direction D for machining the groove portion then performing machining can make the volume to be removed larger by comparison with the conventional method of machining a groove portion.

Therefore, in the method of machining a groove portion according to the first embodiment, if a depth of cut can be made larger, in FIGS. 7A, 7B, 7C, and 7D for example, it is possible to machine the groove portion of the depth L2 by two-time depth of cut by comparison with three-time depth of cut in the conventional machining method. This leads to an effect that the number of times to repeat machining is further reduced.

It is noted that, also in a case that the feedrate of the rotary tool 10 is made higher to remove more volume, the reduced machining time at one tool position results in reduction of the total machining time.

In the method of machining a groove portion according to the first embodiment, additional effects other than the above-described effects can be obtained, as described below. For example, the cutting insert 13 mounted on the outer periphery surface of the main body 12 of the rotary tool 10 is detachable.

Therefore, in a case that the cutting insert 13 becomes worn or damaged due to the long-time machining or high load machining, it is possible that only the worn or damaged cutting insert 13 is replaced, which reduces the production cost and maintenance cost of the rotary tool 10.

Moreover, concerning the main body 12 of the rotary tool 10, the intermediate portion 14 that is formed between any two of the plurality of cutting inserts 13 is shaped in such a way that the radius is smoothly reduced along the rotation direction R in order that the front face 13c of the cutting insert 13 is exposed in the opposite direction to the rotation direction R.

This means that, as the rotary tool 10 rotates, the front face 13c of the cutting insert 13 is exposed so that it always faces the workpiece, and the back face (not shown in the figures) on the opposite side to the front face 13c of the cutting insert 13 is sustained by the intermediate portion 14. This makes an allowable load of the cutting insert 13 higher and achieves smooth machining.

<A Second Embodiment>

Next, the method of machining a groove portion according to a second embodiment will be described with reference to FIGS. 8A, 8B, 8C, and 8D. Here, description of forming a groove portion constituting a part of a gear wheel shape on a workpiece is given, as an embodiment of application of the method of machining a groove portion.

Figure 8A:
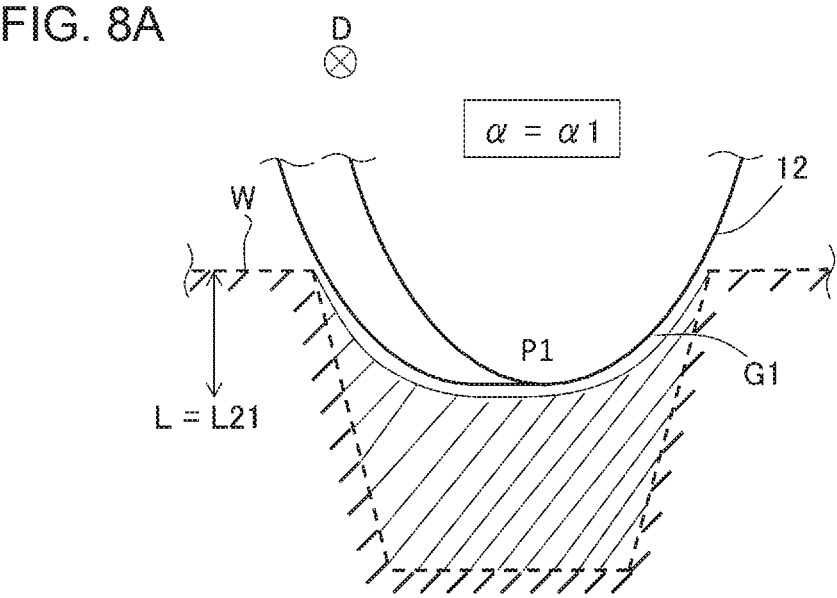
FIG. 8A is an enlarged view of a principal part of a tool and a groove portion that has been machined to a first depth in a second embodiment of the method of machining a groove portion.
Figure 8B:
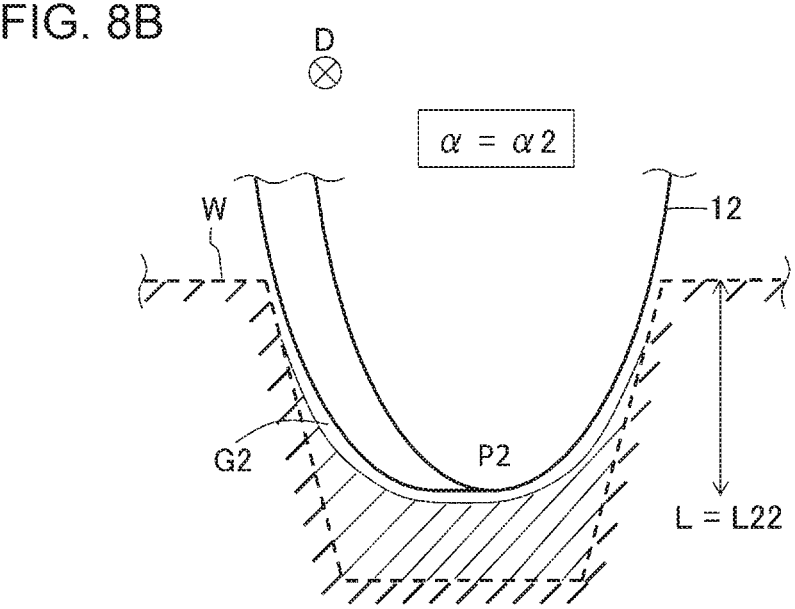
FIG. 8B is an enlarged view of the principal part of the tool and the groove portion that has been machined to a second depth in the second embodiment of the method of machining a groove portion.
Figure 8C:
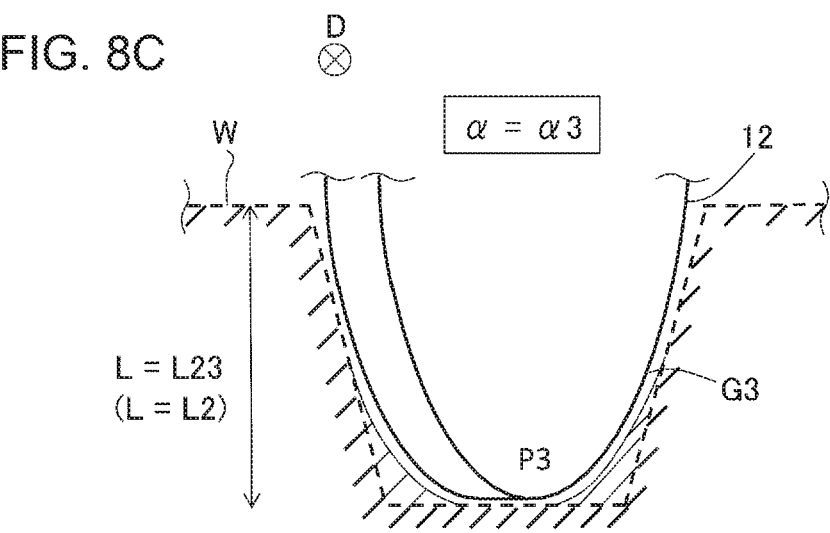
FIG. 8C is an enlarged view of the principal part of the tool and the groove portion that has been machined to a target depth in the second embodiment of the method of machining a groove portion.
Figure 8D:
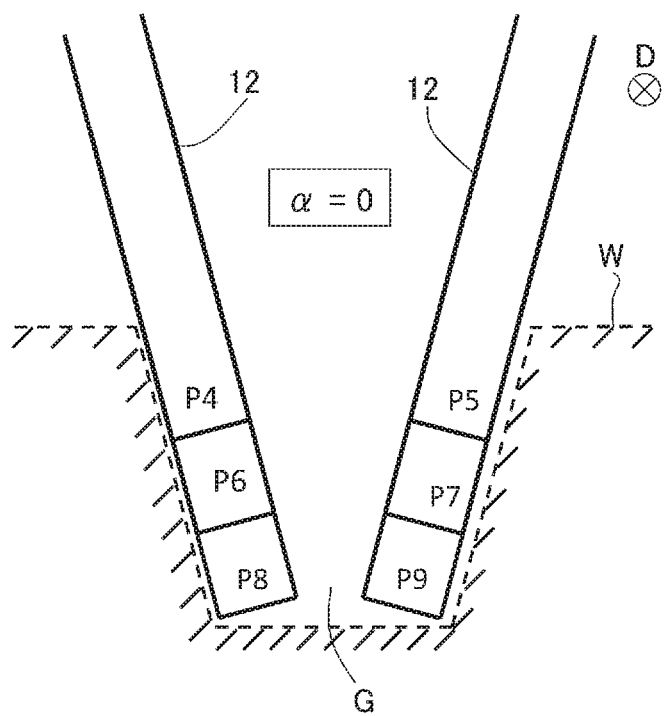
FIG. 8D illustrates an embodiment in which a bottom face and a lateral face of the groove portion are machined according to the second embodiment of the method of machining a groove portion, on an enlarged sectional view of the groove portion.

FIGS. 8A, 8B, 8C, and 8D illustrate an embodiment of machining procedure when forming a groove portion according to the second embodiment on a cross-sectional view of the groove portion. FIG. 8A illustrates the embodiment in which the groove portion has been machined to a first depth, FIG. 8B illustrates the embodiment in which the groove portion has been machined to a second depth, FIG. 8C illustrates the embodiment in which the groove portion has been machined to a target machining depth, and FIG. 8D schematically illustrates the embodiment in which a lateral face and a bottom face of the groove portion are machined.

Here, in the embodiment illustrated in FIGS. 8A, 8B, 8C, and 8D also, machining of a groove portion performed with the both-side cutting rotary tool 10 shown in FIGS. 5A and 5B will be described.

As is the case of FIGS. 7A, 7B, 7C, and 7D, each cross-sectional view in FIGS. 8A, 8B, 8C, and 8D is a view of a groove portion from behind the feeding direction for the machining.

It is noted that the technical feature of the embodiments that "the rotating direction T at the point at which the main body 12 contacts the workpiece W is made inclined at an angle α to the feeding direction D for machining the groove portion and machining is performed by feeding the workpiece W and the rotary tool 10 relatively" is common between the first embodiment and the second embodiment.

Therefore, the description of the structure, etc. of the rotary tool 10 used in the second embodiment is omitted because the structure, etc. of the rotary tool 10 is same as that of the tool 10 in FIGS. 4A, 4B, 5A and 5B.

A tooth shape of the gear wheel normally has such a shape that the width of the tooth top portion is narrower and the width of the root portion is wider. Therefore, in a case that a gear wheel shape is formed on a workpiece, the groove portion to be machined has a shape that the width of the surface side is larger and the width becomes narrower as the depth becomes deeper.

Therefore, the second embodiment illustrated in FIGS. 8A, 8B, 8C, and 8D, describes the above-described procedure for forming a groove portion whose cross-sectional shape is approximate to a trapezoid that the width of the surface side is larger and the width becomes smaller as the depth becomes deeper.

First, as shown in FIG. 8A, the rotary tool 10 is made inclined at an angle $\alpha 1$ (that is, $\alpha = \alpha 1$ in FIG. 5A) to the feeding direction D for machining the groove portion, and then the rotary tool 10 is rotated at a predetermined rotation speed and moved to the depth L21 (that is, L2=L21 in FIG. 5B) (tool position P1).

In this case, as is the case in the first embodiment, it is preferable that, for example in a case that the depth of cut is set at L21 in the preliminary test cutting, the angle $\alpha 1$ should be a maximum inclined angle at which no chattering vibration of the rotary tool 10 is caused.

Moreover, as is the case in FIG. 8A, in the case that the entire width of the groove portion to be machined can be machined at an angle within the maximum inclined angle, it is preferable to adopt an angle that can machine the entire width of the groove portion by one feeding motion.

Then, in the state that the angle $\alpha 1$ and the depth L21 are kept, the workpiece W and the rotary tool 10 are fed relatively in the feeding direction D for machining the groove portion.

The motions as above form the groove portion G1 of the depth L21 and of a uniform width on the workpiece W. It is noted that, as is the case in the first embodiment, when the maximum width that can be machined in the state that the rotary tool 10 is inclined at an angle $\alpha 1$ is smaller than the required width of the groove portion (for example, L1 shown in FIGS. 5A and 5B), the desired width of the groove portion is formed by repeating the machining at every time to change the machining position of the inclined rotary tool 10 in the direction of the width.

Next, as shown in FIG. 8B, the rotary tool 10 is made inclined at an angle $\alpha 2$ that is smaller than the $\alpha 1$ (that is, $\alpha 2 < \alpha 1$) to the feeding direction D for machining the groove portion, and the rotary tool 10 is rotated and moved to the depth L22 (tool position P2).

In this case, as described before, the width of the groove portion that constitutes a part of the gear wheel becomes smaller as the depth of the machining becomes larger, therefore the inclined angle $\alpha 2$ of the rotary tool 10 in FIG. 8B should be smaller than $\alpha 1$ and should be able to machine the entire width of the groove portion in one feeding motion.

As is the case in the first embodiment, because the angle $\alpha 2$ is smaller than $\alpha 1$, the cutting resistance (counter force) Fcos$\alpha$ that the outer edge 13a of the cutting insert 13 receives becomes higher. Therefore, the angle $\alpha 2$ needs to be an angle at which no chattering vibration of the rotary tool 10 is caused (see FIG. 6B).

Then, in the state that the angle $\alpha 2$ and the depth L22 are kept, the workpiece W and the rotary tool 10 are fed relatively in the feeding direction D for machining the groove portion.

The motions as above form the groove portion G2 of the depth L22 and of a uniform width on the workpiece 10. It is noted that in the machining of the groove portion G2 also, as is the case of machining the groove portion G1 illustrated in FIG. 8A, the machining may be repeated at every time to change the machining position of the inclined rotary tool 10 in the direction of the width.

Next, as shown in FIG. 8C, the rotary tool 10 is made inclined only at an angle $\alpha 3$ that is further smaller than $\alpha 2$ (that is, $\alpha 3 < \alpha 2$) to the feeding direction D for machining the groove portion, and then the rotary tool 10 is rotated and moved to the depth L23 (in this description, L23 is equal to the target depth L2) (tool position P3).

In this case, because the angle $\alpha 3$ is smaller than $\alpha 2$, the cutting resistance (counter force) Fcos$\alpha$ that the outer edge 13a of the cutting insert 13 receives becomes further higher. Therefore, the angle $\alpha 3$ needs to be an angle at which no chattering vibration of the rotary tool 10 is caused (see FIG. 6B).

Then, in the state that the angle $\alpha 3$ and the depth L23 are kept, the workpiece W and the rotary tool 10 are fed relatively in the feeding direction D for machining the groove portion.

The motions as above form the groove portion G3 of the depth L23 (that is, L23 is the target depth L2) and of a uniform width on the workpiece W. It is noted that in the machining of the groove portion G3 also, as is the case of machining a groove portion G1 illustrated in FIG. 8A, the machining may be repeated at every time to change the machining position of the inclined rotary tool 10 in the direction of the width.

Next, as is the case in the first embodiment, the machined surface that has been formed in the machining illustrated in FIGS. 8A, 8B, and 8C is machined into a lateral face and a bottom face of the groove portion that are approximate to the final gear wheel shape in additional processes. The machined surface constitutes a continuous curved surface approximate to a part of an ellipse.

In the additional processes, according to an embodiment, as shown in FIG. 8D for example, the inclined angle $\alpha$ between the rotary tool 10 and the feeding direction D for machining the groove portion is set to zero (that is, $\alpha = 0$ in FIG. 3A) and the rotary tool 10 is disposed at the tool positions from P4 to P9 so that the lateral faces and the bottom face of the target gear wheel shape can be machined.

Then, the lateral face and the bottom face of the groove portion are machined by feeding the workpiece W and the rotary tool 10 relatively in the feeding direction D for machining the groove portion at each of the tool positions from P4 to P9.

The motions as above can machine the lateral face of the groove portion flat as if copying the shape of the lateral face of the main body 12 and can also machine the bottom face of the groove portion flat. In this way, a groove portion G having the desired width and depth whose cross-sectional shape is approximate to a trapezoid is formed on the workpiece W.

Moreover, also in the method of machining a groove portion according to the second embodiment illustrated in FIG. 8A, the ability to machine larger width at one tool position makes the width to be machined in the central area of the groove portion G larger. As a result, the number of times to repeat the machining is reduced by comparison with a case of machining a groove portion that has the same width and depth in the conventional method of machining a groove portion.

It is noted that FIGS. 8A, 8B, 8C, and 8D illustrate an embodiment of a cross-sectional shape approximate to a trapezoid as a part of a groove portion of a gear wheel shape, but the method of machining a groove portion according to the embodiments can be applied to machining of a groove portion having a lateral face that constitutes what is called an involute curve or a cycloid curve.

In these cases also, the effect of the machining method according to the embodiments can be obtained, which is that the number of times to repeat the feeding in the central area of the groove portion to be machined is reduced.

<Specific Examples of a Machining Device>

Figure 9:
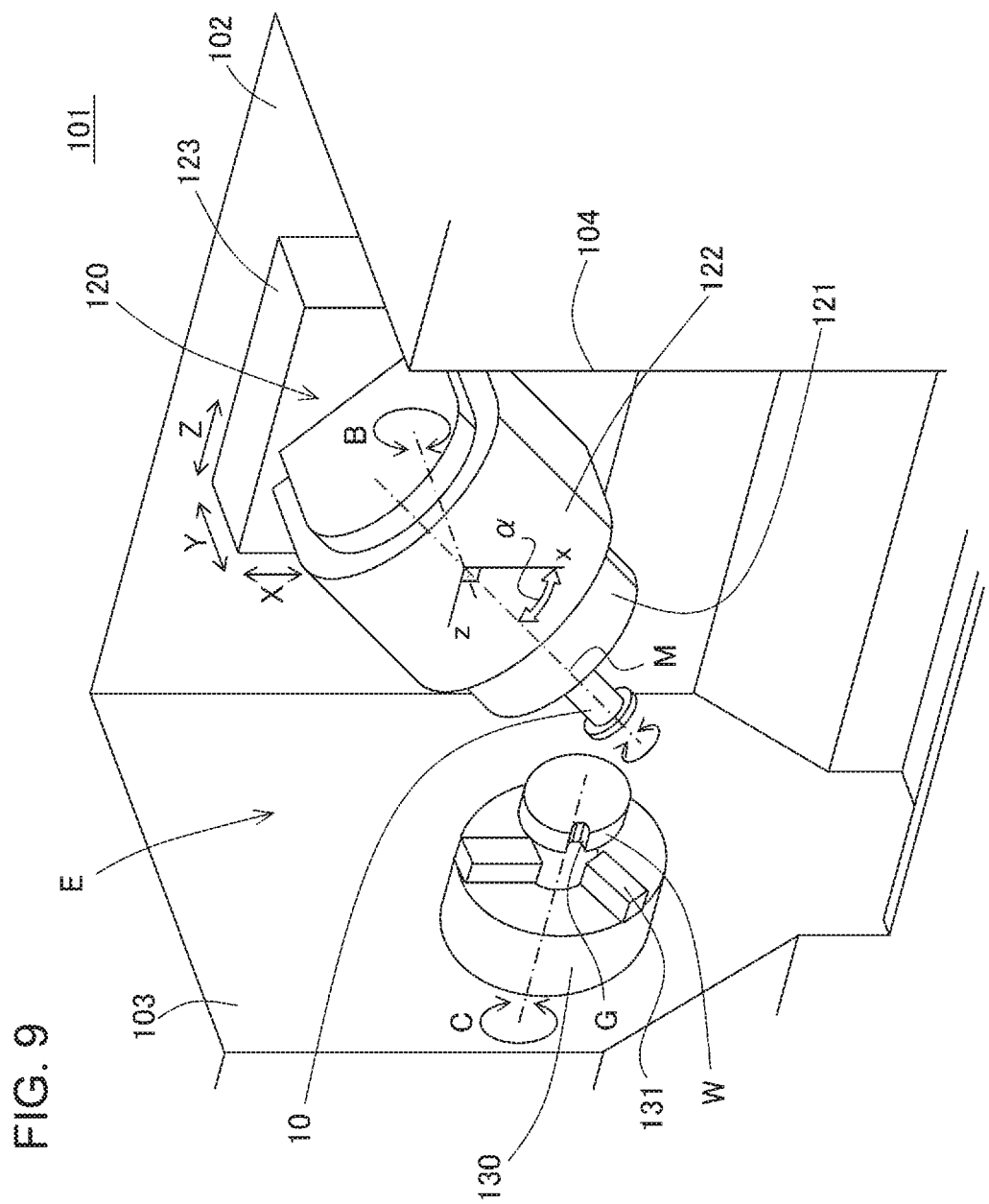
FIG. 9 is a schematic perspective view of a first example of a machining device that performs the method of machining a groove portion.

FIG. 9 is a schematic perspective view of a machining device illustrating a first example of performing the method of machining a groove portion according to the embodiments.

The method of machining a groove portion according to the present invention can be performed with a machine tool such as a multi-tasking machine or a machining center.

As shown in FIG. 9, a machine tool 101 that performs the method of machining a groove portion according to the embodiments includes a machining area E. The machining area E is enclosed with a back face portion 102, a left side face portion 103 and a right side face portion 104, and is open for a front side.

In the machining area E, a spindle unit 120, a traveling unit 123 and a clamping unit 130 are arranged. The spindle unit 120 has the rotary tool 10 shown in FIGS. 4A and 4B or FIGS. 5A and 5B mounted on the unit and rotates and moves the tool. The traveling unit 123 moves the spindle unit 120 in directions of three axes X, Y and Z. The clamping unit 130 holds the workpiece W.

In this description, in FIG. 9, an up and down direction of the machine tool 101 is the direction X, a back and forth direction is the direction Y and a right and left direction is the direction Z.

The spindle unit 120 includes a spindle head 121 and a main unit 122. The spindle head 121 has the rotary tool 10 mounted on its end. The main unit 122 includes a motor, etc. to rotate the spindle head 121.

The rotary tool 10 is mounted on the end of the spindle head 121 and rotates around an M-axis (milling axis) shown in FIG. 9. Then, the main unit 122 is mounted rotatably on the traveling unit 123 so that an angle α between the main unit 122 and the X-axis on an XZ-plane can be set at any degrees by turning the M-axis around the Y-axis that is perpendicular to the XZ-plane in a direction B.

Meanwhile, the workpiece W is mounted on the clamping unit 130 by, for example, a chucking system 131, etc. Moreover, in this case, it is possible that the clamping unit 130 holds the workpiece W and rotates around the Z-axis in a direction C.

In addition, the clamping unit 130 may travel back and forth in the direction Z.

In a case of performing the method of machining a groove portion G with the machine tool 101 as above, for example, in a state in which the clamping unit 130 holds the workpiece W, the main unit 122 is rotated in the direction B and fixed so that the main unit 122 makes "an angle α" to the X-axis on the XZ plane.

In this state, the rotary tool 10 is rotated and the traveling unit 123 is driven, thus, the rotary tool 10 is moved to the predetermined depth of cut at the edge surface of the workpiece W. Then, the workpiece W and the rotary tool 10 are fed relatively by moving the main unit 122 in the direction Z.

By means of the procedure as above, the method of machining a groove portion G according to the embodiments as shown in FIGS. 4A, 4B, 5A, and 5B can be performed.

In addition, for example, it is possible to form a plurality of groove portions G adjacent to each other that constitute the gear wheel shape on the outer periphery surface of the workpiece W by machining one groove portion G first and then repeating the following steps: turning the workpiece W just by a predetermined angle in the direction C, newly moving the rotary tool 10 to a predetermined depth of cut, and performing the method of machining a groove portion according to the embodiments.

The machine tool 101 shown in FIG. 9 forms a groove portion G on the workpiece W by feeding the traveling unit 123 only in the direction Z after moving the rotary tool 10 to the depth of cut, therefore the machine tool 101 is effective, in particular, in machining a linear groove portion.

It is noted that the relative feeding motion between the workpiece W and the rotary tool 10 may be performed by moving the clamping unit 130 back and forth in the direction Z instead of traveling of the main unit 122.

In addition, the machine tool 101 shown in FIG. 9 can perform the machining, whichever of the one-side cutting rotary tool 10 shown in FIGS. 4A and 4B and the both-side cutting rotary tool 10 shown in FIGS. 5A and 5B is mounted on the spindle head 121.

However, in the case of performing the method of machining a groove portion G with the one-side cutting rotary tool 10 such as machining of a lateral face of the groove portion G illustrated in FIGS. 7D or 8D, the rotary tool 10 with the side edge 13b of the cutting insert 13 disposed only on one of the lateral faces of the main body 12 cannot machine both of the lateral faces of the groove portion G in a same posture.

An example of machining a lateral face of a groove portion in a case like this will be described with reference to FIGS. 10A and 10B, below.

Figure 10A:
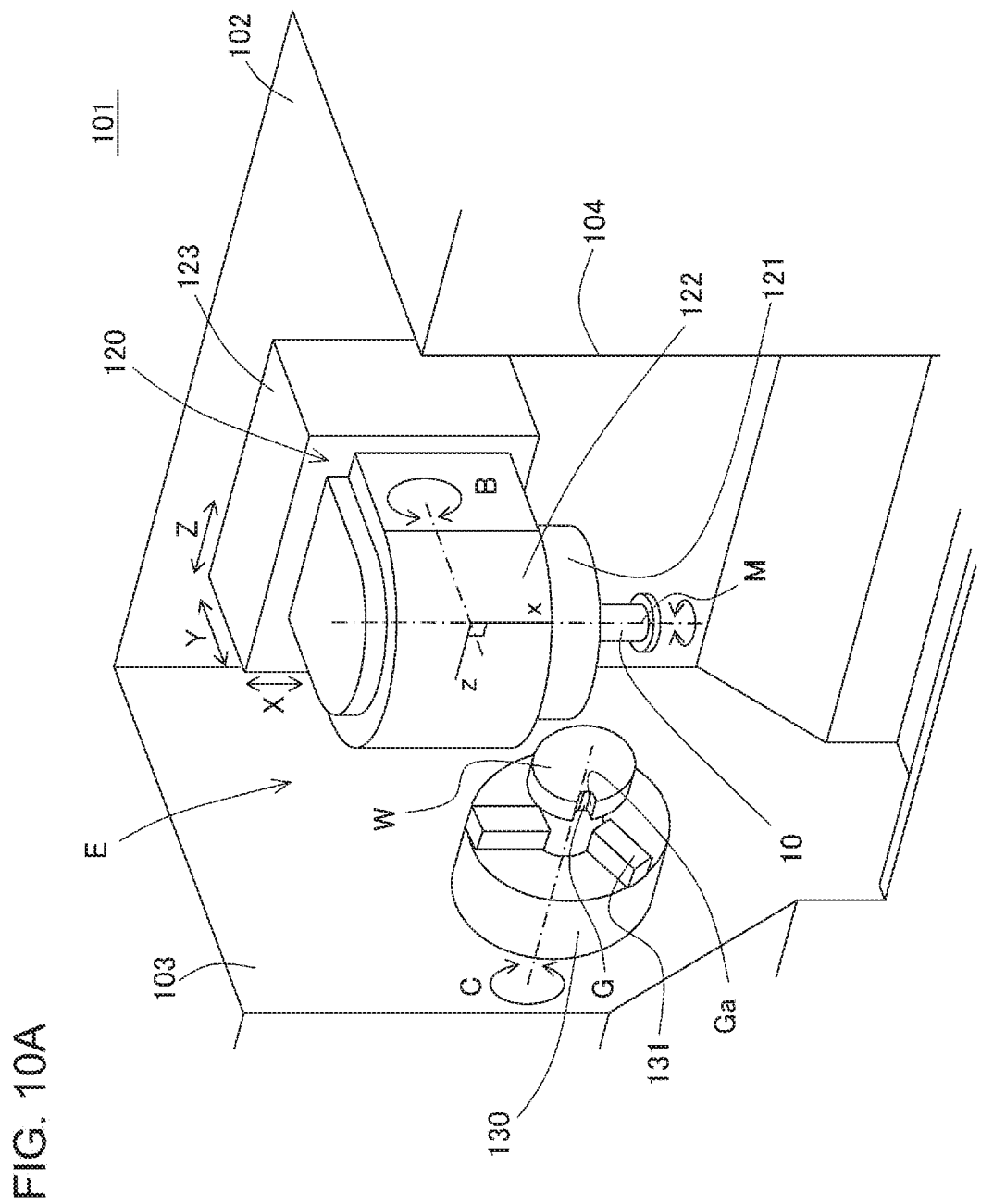
FIG. 10A is a schematic perspective view of the first example of the machining device illustrated in FIG. 9 that is machining one of the lateral faces of a groove portion with the one-side cutting rotary tool.
Figure 10B:
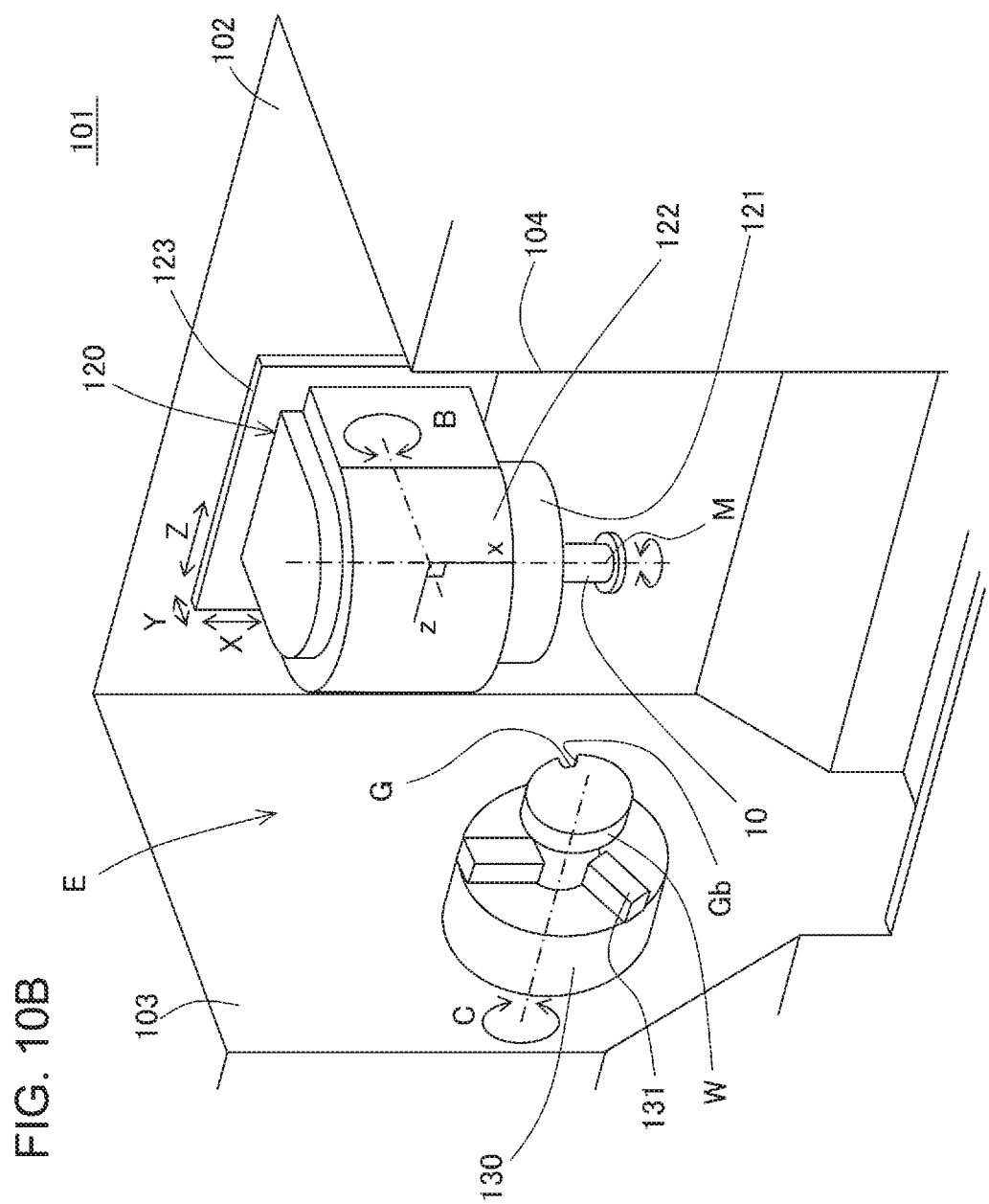
FIG. 10B is a schematic perspective view of the first example of the machining device illustrated in FIG. 9 that is machining another of the lateral faces of the groove portion with the one-side cutting rotary tool.

FIGS. 10A and 10B are schematic perspective views of the machining device illustrating machining of a lateral face of the groove portion G with the one-side cutting rotary tool 10. FIG. 10A illustrates an example in which one of the lateral faces of the groove portion is machined and FIG. 10B illustrates an example in which another of the lateral faces is machined.

As shown in FIGS. 4A and 4B, the one-side cutting rotary tool 10 has the side edge 13b of the cutting insert 13 on the lateral face of the main body 12 opposite to the base portion 11. Therefore, when the rotary tool 10 is mounted on the spindle head 121, the cutting part of the side edge 13b is located on an undersurface of the rotary tool 10.

Therefore, when machining of the lateral face of the groove portion G is performed with the one-side cutting rotary tool 10 mounted on the spindle head 121, the main unit 122 is rotated in the direction B so that the angle between the M-axis of the spindle head 121 and the X-axis on the XZ plane is zero (that is, the inclined angle α=0), as shown in FIG. 10A.

Then, the clamping unit 130 that is holding the workpiece W is rotated in the direction C, and one of lateral faces Ga of the groove portion G to be machined is set at a position that corresponds to the side edge 13b of the cutting insert 13 of the rotary tool 10.

In this state, the rotary tool 10 is being rotated, and the workpiece W and the rotary tool 10 are fed relatively in the direction Z. In this way, the machining of the lateral face Ga is performed.

In such a case in which the lateral face Ga of the groove portion G to be machined constitutes the gear wheel shape (that is, the lateral faces are not parallel to each other) for example, the rotary tool 10 is moved to a certain position in the directions XYZ and the clamping unit 130 is turned by a certain angle in the direction C appropriately in accordance with the lateral face Ga, and the workpiece W and the rotary tool 10 are fed relatively in the direction Z, then these motions are repeated, thus the lateral face Ga of the groove portion G that has a complicated shape can be machined.

Then, in the case of machining the other lateral face Gb of the groove portion G, as shown in FIG. 10B, the clamping unit 130 is turned by approximate 180 degrees in the direction C to change the position of the groove portion G of the workpiece W and the position of the rotary tool 10 is changed in the direction Y so that the side edge 13b of the cutting insert 13 of the rotary tool 10 fits the other lateral face Gb of the groove portion G.

In this case, the inclined angle α of the rotary tool 10 remains unchanged and keeps zero.

In this state, machining of the lateral face Gb is performed by rotating the rotary tool 10 and feeding the workpiece W and the rotary tool 10 relatively in the direction Z.

When the lateral face Gb of the groove portion G to be machined is not parallel to the lateral face Ga, as is the case in the above-stated machining of the lateral face Ga, the rotary tool 10 is moved to a certain position in the directions XYZ and the clamping unit 130 is turned by a certain angle in the direction C appropriately in accordance with the lateral face Gb, and the workpiece W and the rotary tool 10 are fed relatively in the direction Z, then these motions are repeated, thus the lateral face Gb of the groove portion G that has a complicated shape can be machined.

Figure 11:
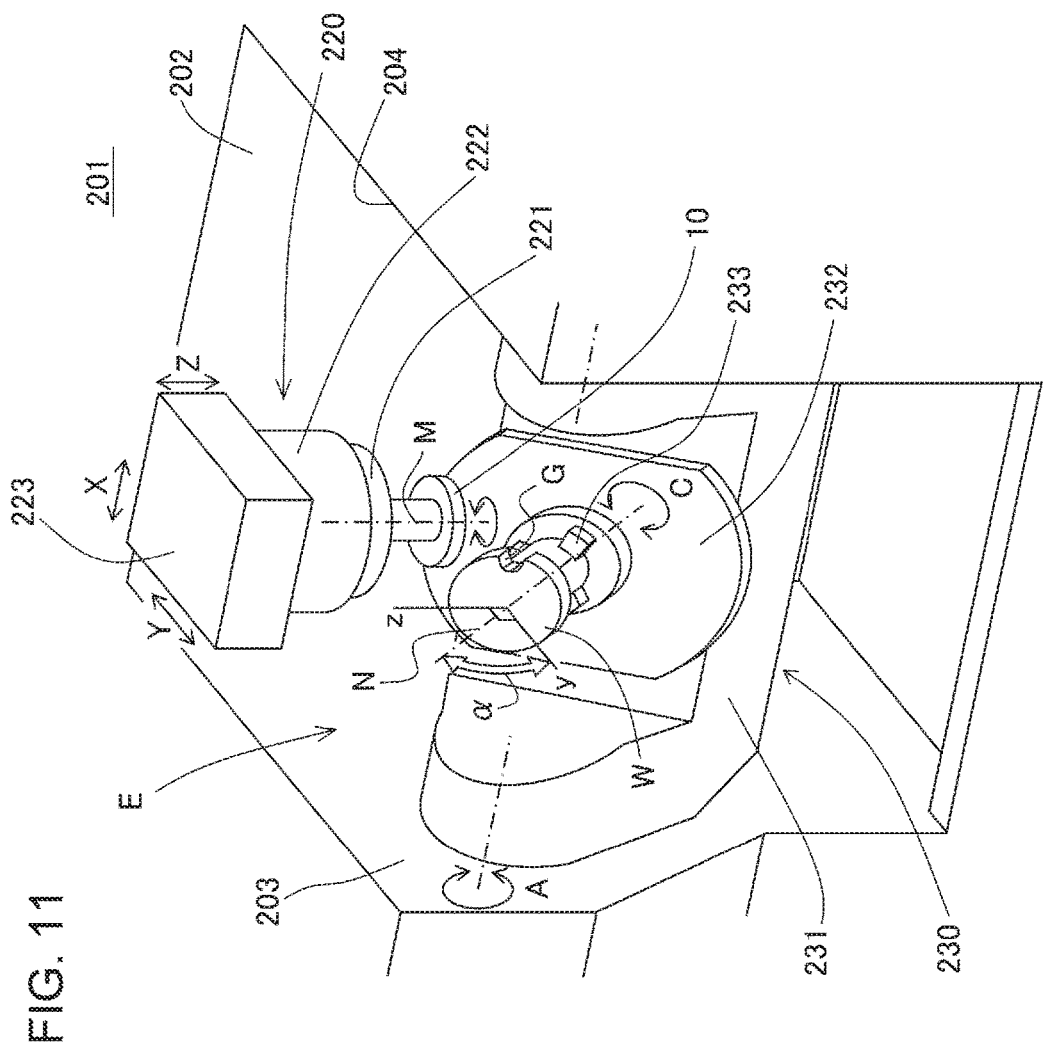
FIG. 11 is a schematic perspective view of a second example of the machining device that performs the method of machining a groove portion.

FIG. 11 is a schematic perspective view of a machining device illustrating a second example of performing the method of machining a groove portion according to the embodiments.

As shown in FIG. 11, a machine tool 201 to perform the method of machining a groove portion according to the embodiments includes a machining area E. The machining area E is enclosed with a back face portion 202, a left side face portion 203 and a right side face portion 204, and is open for the front side.

In the machining area E, a spindle unit 220, a traveling unit 223 and a clamping unit 230 are arranged. The spindle unit 220 has the rotary tool 10 shown in FIGS. 4A and 4B or FIGS. 5A and 5B mounted on the unit and rotates the tool. The traveling unit 223 makes the spindle unit 220 travel in the directions of the three axes X, Y and Z. The clamping unit 230 holds the workpiece W.

In this description, in FIG. 11, it is assumed that a right and left direction of the machine tool 201 is the direction X, a back and forth direction is the direction Y and an up and down direction is the direction Z.

The spindle unit 220 includes a spindle head 221 and a main unit 222. The spindle head 221 has the rotary tool 10 on its end. The main unit 222 includes a motor etc. to rotate the spindle head 221.

The rotary tool 10 is mounted on the end of the spindle head 221 and rotates around the M-axis (milling axis).

The clamping unit 230 includes a swinging bed 231 and a turning table 232. The swinging bed 231 is sustained by both a left side face portion 203 and a right side face portion 204 and turns around the X-axis in a direction A. The turning table 232 is attached on the flat face portion of the swinging bed 231.

The workpiece W is mounted on the turning table 232 by means of the chucking system 233, etc. Rotating the swinging bed 231 in the direction A can set an angle α at any degrees. The swinging bed 231 includes the chucking system 233 that is clamping the workpiece W. The angle α is an angle between the rotation axis of the turning table 232 (N-axis) and the Y-axis on a YZ plane.

In a case of performing the method of machining a groove portion according to the embodiments with the machine tool 201 as above, for example, the workpiece W is clamped on the turning table 232 of the clamping unit 230, and then the rotary tool 10 mounted on the spindle head 221 is rotated, and next, the swinging bed 231 is rotated in the direction A in order to set the angle α to the Y-axis on the YZ plane at a predetermined degree.

In this state, rotating the rotary tool 10 and driving the traveling unit 223 make the rotary tool 10 set at a position of a predetermined depth of cut based on an edge surface of the workpiece W. And then, controlling the traveling unit 223 to travel in the directions XYZ in order to move the rotary tool 10 in the direction of the N-axis makes the workpiece W and the rotary tool 10 fed relatively in the direction of the N-axis.

The method of machining a groove portion as shown in FIGS. 4A, 4B, 5A, and 5B can be performed through the procedure as above.

Moreover, as is the case in the example shown in FIG. 9, it is possible, for example, to form a plurality of groove portions G adjacent to each other that constitute the gear wheel shape on the outer periphery surface of the workpiece W by machining one groove portion G first and then repeating the following steps: rotating the workpiece W by a predetermined angle in the direction C, newly moving the rotary tool 10 to a predetermined depth of cut, and performing the method of machining a groove portion according to the embodiments.

The machine tool 101 of the first example shown in FIG. 9 needs to have a system to rotate the main unit 122 that includes the spindle head 121 in the direction B.

On the contrary, the machine tool 201 of the second example shown in FIG. 11 can perform the method of machining a groove portion according to the embodiments and reduce an increase in the machine tool cost because a general multi-tasking machine that has the clamping unit 230 that includes the swinging bed 231 rotating in the direction A can be applied to the machine tool 201.

It is noted that the present invention is not limited to the modes of the first embodiment and second embodiment and includes a wide range of variations.

For example, in the first embodiment, an example in which the cutting insert has a quadrilateral-shaped cross section and includes an outer edge and a side edge has been given, however, it is possible that two sets of an outer edge and a side edge are disposed on surfaces facing each other and that the cutting insert with a round-shaped cross section or an ellipse-shaped cross section is adopted.

Using the cutting inserts with these structures can extend a life of the cutting insert even when the cutting insert becomes worn due to long time machining, because rotating a fixing portion of the cutting insert can expose an unused area of the insert.

Furthermore, an example has been given in which conducting a preliminary test on a workpiece of a same material determines the inclined angle α between the feeding direction D for machining the groove portion and the rotary tool 10 shown in FIGS. 4A and 4B or FIGS. 5A and 5B within a range of angles at which no chattering vibration of the rotary tool 10 is caused. However, by means of using a machining simulation software, etc. for example, it is possible to calculate the angle α for the next machining at every time the machining is repeated, based on the cross-sectional shape of the groove portion to be machined after considering the relation between the volume that was machined in the previous machining and the remaining volume to be removed by rough machining, the depth of cut of the cutting insert, and the outer diameter of the main body.

These modifications can improve machining accuracy and machining efficiency because performing preliminary simulation makes it possible to set an optimum volume to be removed and optimum machining conditions, in considering the life of the rotary tool. In addition, the preliminary test cutting is no longer needed, which leads to reduction of overall cost.

Moreover, in the second embodiment, an example in which groove portions to be machined constitute a part of a gear wheel shape has been given. However, it is possible to apply the method of machining a groove portion according to the present invention to groove machining on an engine case of a jet engine, to machining of a screw part of a trapezoidal thread, or to machining of spiral grooves formed on an outer periphery of a round rod stock, for example.

Furthermore, in the second embodiment, an example of machining a gear wheel shape has been given, concretely. However, performing machining of a groove portion according to the procedure described in the second embodiment as rough machining and then performing finish machining on the lateral face portion and on the bottom face portion of the groove portion may be utilized as a method of producing a gear wheel.

The invention claimed is:

1. A method for machining a workpiece, comprising:
   rotating a rotary tool around a rotation axis, the rotary tool including an edge positioned on an outer periphery of the rotary tool around the rotation axis, the rotary tool being oriented such that, when the edge contacts the workpiece, a tangential rotating direction of the edge is at an inclined angle with respect to a feeding direction for machining the workpiece;
   relatively moving the rotary tool toward the workpiece so that the edge cuts the workpiece by a first predetermined depth while the rotary tool is rotated around the rotation axis;
   relatively moving the rotary tool with respect to the workpiece in the feeding direction;
   repeating the relative movement of the rotary tool toward the workpiece so that the edge cuts the workpiece to a second predetermined depth that is greater than the first predetermined depth; and
   repeating the relative movement of the rotary tool and the workpiece in the feeding direction.

2. The method according to claim 1, further comprising:
   changing the inclined angle by changing a relative orientation of the rotary tool and the feeding direction before the repeating of the relative movement of the rotary tool toward the workpiece.

3. The method according to claim 2, further comprising:
   after the repeating of the relative movement of the rotary tool toward the workpiece in the feeding direction:
      orienting the rotary tool such that, when the edge contacts the workpiece, the tangential rotating direction of the edge is not inclined with respect to the feeding direction; and
      further repeating the relative movement of the rotary tool toward the workpiece so that the edge cuts the workpiece to the second predetermined depth; and
      further repeating the relative movement of the rotary tool and the workpiece in the feeding direction.

4. The method according to claim 1, further comprising:
   reducing the inclined angle by changing a relative orientation of the rotary tool and the feeding direction before the repeating of the relative movement of the rotary tool toward the workpiece.

5. The method according to claim 1, further comprising:
   defining the inclined angle based on:
      a cross-sectional shape of a groove to be formed by the method;
      the predetermined depth; and
      an outer diameter of edge of the rotary tool.

6. The method according to claim 1, wherein the machining is a rough machining.

7. The method according to claim 6, wherein a groove to be formed by the method corresponds to a tooth shape of a gear wheel.

8. A method for producing a gear wheel, comprising:
   performing the rough machining according to claim 6; and
   performing a finish machining to form a tooth shape of a predetermined gear wheel.

* * * * *